US012585929B2

(12) United States Patent　　　(10) Patent No.:　US 12,585,929 B2

Lamy-Poirier　　　(45) Date of Patent:　Mar. 24, 2026

(54) LAYERED GRADIENT ACCUMULATION AND MODULAR PIPELINE PARALLELISM FOR IMPROVED TRAINING OF MACHINE LEARNING MODELS

(71) Applicant: ServiceNow, Inc., Santa Clara, CA (US)

(72) Inventor: Joel Lamy-Poirier, Montreal (CA)

(73) Assignee: ServiceNow, Inc., Santa Clara, CA (US)

( * ) Notice: Subject to any disclaimer, the term of this patent is extended or adjusted under 35 U.S.C. 154(b) by 1051 days.

(21) Appl. No.: 17/668,200

(22) Filed: Feb. 9, 2022

(65) Prior Publication Data

US 2022/0383084 A1　Dec. 1, 2022

Related U.S. Application Data

(60) Provisional application No. 63/194,389, filed on May 28, 2021.

(51) Int. Cl.
| | |
|---|---|
| *G06N 3/063* | (2023.01) |
| *G06F 18/214* | (2023.01) |
| *G06N 3/084* | (2023.01) |

(52) U.S. Cl.
CPC ......... *G06N 3/063* (2013.01); *G06F 18/2155* (2023.01); *G06N 3/084* (2013.01)

(58) Field of Classification Search
CPC ..... G06F 18/2155; G06N 3/084; G06N 3/063
See application file for complete search history.

(56) References Cited

U.S. PATENT DOCUMENTS

| | | | |
|---|---|---|---|
| 4,941,084 | A | 7/1990 | Terada et al. |
| 5,185,860 | A | 2/1993 | Wu |

(Continued)

FOREIGN PATENT DOCUMENTS

| | | |
|---|---|---|
| EP | 0433979 | 6/1991 |
| EP | 1607824 | 12/2005 |

(Continued)

OTHER PUBLICATIONS

Hu et al. ("PipeEdge: Pipeline Parallelism for Large-Scale Model Inference on Heterogeneous Edge Devices", 2022 25th Euromicro Conference on Digital System Design (DSD), pp. 298-307).*

(Continued)

*Primary Examiner* — Jennifer N Welch
(74) *Attorney, Agent, or Firm* — McDonnell Boehnen Hulbert & Berghoff LLP

(57) ABSTRACT

A method is provided including: (i) assigning sequentially-ordered layers of a machine learning model to a plurality of compute nodes, each of the layers being assigned to exactly one of the nodes; (ii) dividing training data into micro-batches; (iii) forward-propagating the micro-batches through the model, each node operating in parallel to generate respective activation states for the micro-batches with their assigned layers, and with the activation states being communicated between the nodes according to the layers' sequential ordering; and (iv) backward-propagating the micro-batches through the model, each node operating in parallel to generate respective error states for the micro-batches with their assigned layers, with the error states being communicated between the nodes according to the layers' reverse sequential ordering, wherein each of the nodes completes the backward-propagation of all micro-batches through a given layer prior to performing backward-propa- (Continued)

ASSIGN LAYERS OF A MACHINE LEARNING MODEL TO A PLURALITY OF COMPUTE NODES, WHEREIN EACH OF THE LAYERS IS ASSIGNED TO EXACTLY ONE OF THE COMPUTE NODES, WHEREIN THE LAYERS HAVE A SEQUENTIAL ORDERING ←910

DIVIDE TRAINING DATA FOR THE MACHINE LEARNING MODEL INTO A PLURALITY OF MICRO-BATCHES ←912

PERFORM A FORWARD-PROPAGATION OF THE MICRO-BATCHES THROUGH THE MACHINE LEARNING MODEL, WHEREIN EACH OF THE COMPUTE NODES OPERATES IN PARALLEL TO GENERATE RESPECTIVE ACTIVATION STATES FOR THE MICRO-BATCHES WITH EACH OF ITS ASSIGNED LAYERS, AND WHEREIN THE RESPECTIVE ACTIVATION STATES ARE COMMUNICATED BETWEEN THE COMPUTE NODES IN ACCORDANCE WITH THE SEQUENTIAL ORDERING OF THE LAYERS ←914

PERFORM A BACKWARD-PROPAGATION OF THE MICRO-BATCHES THROUGH THE MACHINE LEARNING MODEL, WHEREIN EACH OF THE COMPUTE NODES OPERATES IN PARALLEL TO GENERATE RESPECTIVE ERROR STATES FOR THE MICRO-BATCHES WITH EACH OF ITS ASSIGNED LAYERS, WHEREIN THE RESPECTIVE ERROR STATES ARE COMMUNICATED BETWEEN THE COMPUTE NODES IN ACCORDANCE WITH A REVERSAL OF THE SEQUENTIAL ORDERING OF THE LAYERS, AND WHEREIN EACH OF THE COMPUTE NODES COMPLETES THE BACKWARD-PROPAGATION OF ALL OF THE MICRO-BATCHES THROUGH A GIVEN LAYER PRIOR TO PERFORMING BACKWARD-PROPAGATION THROUGH ANY LAYER THAT PRECEDES THE GIVEN LAYER IN THE SEQUENTIAL ORDERING ←916 gation through any layer that precedes the given layer in the sequential ordering.

19 Claims, 14 Drawing Sheets

(56)                    References Cited

U.S. PATENT DOCUMENTS

| | | | |
|---|---|---|---|
| 5,237,518 A | 8/1993 | Sztipanovits et al. |
| 5,261,097 A | 11/1993 | Saxon |
| 5,265,252 A | 11/1993 | Rawson, III et al. |
| 5,367,685 A | 11/1994 | Gosling |
| 5,390,297 A | 2/1995 | Barber et al. |
| 5,442,791 A | 8/1995 | Wrabetz et al. |
| 5,452,415 A | 9/1995 | Hotka |
| 5,522,042 A | 5/1996 | Fee et al. |
| 5,533,116 A | 7/1996 | Vesterinen |
| 5,655,081 A | 8/1997 | Bonnell et al. |
| 5,659,736 A | 8/1997 | Hasegawa et al. |
| 5,671,412 A | 9/1997 | Christiano |
| 5,696,701 A | 12/1997 | Burgess et al. |
| 5,715,463 A | 2/1998 | Merkin |
| 5,745,879 A | 4/1998 | Wyman |
| 5,761,502 A | 6/1998 | Jacobs |
| 5,764,913 A | 6/1998 | Jancke et al. |
| 5,887,139 A | 3/1999 | Madison, Jr. et al. |
| 5,909,217 A | 6/1999 | Bereiter |
| 5,937,165 A | 8/1999 | Schwaller et al. |
| 5,949,976 A | 9/1999 | Chappelle |
| 5,978,594 A | 11/1999 | Bonnell et al. |
| 6,021,437 A | 2/2000 | Chen et al. |
| 6,041,347 A | 3/2000 | Harsham et al. |
| 6,088,717 A | 7/2000 | Reed et al. |
| 6,101,500 A | 8/2000 | Lau |
| 6,128,016 A | 10/2000 | Coelho et al. |
| 6,131,118 A | 10/2000 | Stupek, Jr. et al. |
| 6,134,581 A | 10/2000 | Ismael et al. |
| 6,138,122 A | 10/2000 | Smith et al. |
| 6,148,335 A | 11/2000 | Haggard et al. |
| 6,166,732 A | 12/2000 | Mitchell et al. |
| 6,167,448 A | 12/2000 | Hemphill et al. |
| 6,175,866 B1 | 1/2001 | Holloway et al. |
| 6,175,878 B1 | 1/2001 | Seaman et al. |
| 6,260,050 B1 | 7/2001 | Yost et al. |
| 6,263,457 B1 | 7/2001 | Anderson et al. |
| 6,272,150 B1 | 8/2001 | Hrastar et al. |
| 6,336,138 B1 | 1/2002 | Caswell et al. |
| 6,363,421 B2 | 3/2002 | Barker et al. |
| 6,393,386 B1 | 5/2002 | Zager et al. |
| 6,397,245 B1 | 5/2002 | Johnson, II et al. |
| 6,434,626 B1 | 8/2002 | Prakash et al. |
| 6,438,592 B1 | 8/2002 | Killian |
| 6,456,306 B1 | 9/2002 | Chin et al. |
| 6,466,932 B1 | 10/2002 | Dennis et al. |
| 6,487,590 B1 | 11/2002 | Foley et al. |
| 6,505,248 B1 | 1/2003 | Casper et al. |
| 6,526,442 B1 | 2/2003 | Stupek, Jr. et al. |
| 6,621,823 B1 | 9/2003 | Mellquist et al. |
| 6,707,795 B1 | 3/2004 | Noorhosseini et al. |
| 6,742,015 B1 | 5/2004 | Bowman-Amuah |
| 6,763,380 B1 | 7/2004 | Mayton et al. |
| 6,816,898 B1 | 11/2004 | Scarpelli et al. |
| 6,895,586 B1 | 5/2005 | Brasher et al. |
| 6,948,175 B1 | 9/2005 | Fong et al. |
| 6,985,901 B1 | 1/2006 | Sachse et al. |
| 7,003,564 B2 | 2/2006 | Greuel et al. |
| 7,028,228 B1 | 4/2006 | Lovy et al. |
| 7,043,537 B1 | 5/2006 | Pratt |
| 7,043,661 B2 | 5/2006 | Valadarsky et al. |
| 7,062,683 B2 | 6/2006 | Warpenburg et al. |
| 7,096,459 B2 | 8/2006 | Keller et al. |
| 7,146,574 B2 | 12/2006 | Goldthwaite et al. |
| 7,197,466 B1 | 3/2007 | Peterson et al. |
| 7,215,360 B2 | 5/2007 | Gupta |
| 7,216,304 B1 | 5/2007 | Gourdol et al. |

| | | | |
|---|---|---|---|
| 7,222,147 B1 | 5/2007 | Black et al. |
| 7,281,170 B2 | 10/2007 | Taylor et al. |
| 7,412,502 B2 | 8/2008 | Fearn et al. |
| 7,505,872 B2 | 3/2009 | Keller et al. |
| 7,593,013 B2 | 9/2009 | Agutter et al. |
| 7,596,716 B2 | 9/2009 | Frost et al. |
| 7,617,073 B2 | 11/2009 | Trinon et al. |
| 7,660,731 B2 | 2/2010 | Chaddha et al. |
| 7,676,294 B2 | 3/2010 | Baier et al. |
| 7,676,437 B2 | 3/2010 | Satkunanathan et al. |
| 7,840,490 B1 | 11/2010 | Sellers et al. |
| 7,877,783 B1 | 1/2011 | Cline et al. |
| 7,890,869 B1 | 2/2011 | Mayer et al. |
| 7,966,398 B2 | 6/2011 | Wiles, Jr. |
| 8,060,396 B1 | 11/2011 | Bessler et al. |
| 8,196,210 B2 | 6/2012 | Sterin |
| 8,321,948 B2 | 11/2012 | Robinson et al. |
| 8,407,669 B2 | 3/2013 | Yee et al. |
| 8,554,750 B2 | 10/2013 | Rangarajan et al. |
| 8,595,647 B2 | 11/2013 | Sabin et al. |
| 8,620,818 B2 | 12/2013 | Hughes et al. |
| 8,646,093 B2 | 2/2014 | Myers et al. |
| 8,674,992 B2 | 3/2014 | Poston et al. |
| 8,725,647 B2 | 5/2014 | Disciascio et al. |
| 9,053,460 B2 | 6/2015 | Gilbert et al. |
| 10,673,963 B1 | 6/2020 | Feiguine et al. |
| 10,749,943 B1 | 8/2020 | Feiguine et al. |
| 10,771,344 B2 | 9/2020 | Bitterfeld et al. |
| 10,824,650 B2 | 11/2020 | Bar Oz et al. |
| 10,944,654 B2 | 3/2021 | Rimar et al. |
| 11,089,115 B2 | 8/2021 | Garty et al. |
| 11,095,506 B1 | 8/2021 | Erblat et al. |
| 11,520,592 B2 * | 12/2022 | Pudipeddi .............. G06N 3/082 |
| 2002/0116340 A1 | 8/2002 | Hellberg et al. |
| 2002/0133584 A1 | 9/2002 | Greuel et al. |
| 2002/0158969 A1 | 10/2002 | Gupta |
| 2003/0118087 A1 | 6/2003 | Goldthwaite et al. |
| 2003/0200293 A1 | 10/2003 | Fearn et al. |
| 2005/0015217 A1 | 1/2005 | Weidl et al. |
| 2005/0091356 A1 | 4/2005 | Izzo |
| 2006/0026453 A1 | 2/2006 | Frost et al. |
| 2006/0095461 A1 | 5/2006 | Raymond |
| 2006/0179058 A1 | 8/2006 | Bram et al. |
| 2006/0293942 A1 | 12/2006 | Chaddha et al. |
| 2007/0033279 A1 | 2/2007 | Battat et al. |
| 2007/0188494 A1 | 8/2007 | Agutter et al. |
| 2007/0288389 A1 | 12/2007 | Vaughan et al. |
| 2008/0133289 A1 | 6/2008 | Armour et al. |
| 2008/0148253 A1 | 6/2008 | Badwe et al. |
| 2008/0319779 A1 | 12/2008 | Hughes et al. |
| 2009/0088875 A1 | 4/2009 | Baier et al. |
| 2009/0228984 A1 | 9/2009 | Sterin |
| 2010/0110932 A1 | 5/2010 | Doran et al. |
| 2018/0123940 A1 | 5/2018 | Rimar et al. |
| 2019/0104398 A1 | 4/2019 | Owen et al. |
| 2019/0130292 A1 * | 5/2019 | N .............................. G06N 3/04 |
| 2020/0050689 A1 | 2/2020 | Tal et al. |
| 2020/0204443 A1 | 6/2020 | Bar Oz et al. |
| 2020/0311536 A1 * | 10/2020 | Venkataramani .... G06N 3/0464 |
| 2021/0019151 A1 * | 1/2021 | Pudipeddi .............. G06N 3/063 |
| 2021/0019152 A1 * | 1/2021 | Pudipeddi .............. G06N 3/098 |
| 2021/0019634 A1 * | 1/2021 | Pudipeddi .............. G06N 3/098 |
| 2021/0042620 A1 * | 2/2021 | Chen ........................ G06N 3/08 |
| 2021/0194764 A1 | 6/2021 | Badyan et al. |

FOREIGN PATENT DOCUMENTS

| | | |
|---|---|---|
| WO | WO 99/34285 | 7/1999 |
| WO | WO 00/52559 | 9/2000 |
| WO | WO 01/79970 | 10/2001 |

OTHER PUBLICATIONS

Brown et al., "Language Models are Few-Shot Learners", Jul. 22, 2020.

Chen et al., "Training Deep Nets with Sublinear Memory Cost", Apr. 22, 2016.

(56)                    References Cited

OTHER PUBLICATIONS

Devlin et al., "BERT: Pre-training of Deep Bidirectional Transformers for Language Understanding", May 24, 2019.
Duchi et al., "Asynchronous stochastic convex optimization", Aug. 4, 2015.
Fedus et al., "Switch Transformers: Scaling To Trillion Parameter Models With Simple And Efficient Sparsity", Jan. 11, 2021.
Golmant et al., "On The Computational Inefficiency Of Large Batch Sizes For Stochastic Gradient Descent", Nov. 30, 2018.
Hannah et al., "On Unbounded Delays in Asychronous Parallel Fixed-Point Algorithms", Aug. 18, 2017.
Harlap et al., "PipeDream: Fast and Efficient Pipeline Parallel DNN Training", Jun. 8, 2018.
Hendrycks et al., "Gaussian Error Linear Units (GELUs)", Jul. 8, 2020.
Huang et al., "GPipe: Easy Scaling with Micro-Batch Pipeline Parallelism", Jul. 25, 2019.
Ioffe et al., "Batch Normalization: Accelerating Deep Network Training by Reducing Internal Covariate Shift", Mar. 2, 2015.
Kaplan et al., "Scaling Laws for Neural Language Models", Jan. 23, 2020.
Kwon et al., "Beyond the Memory Wall: A Case for Memory-centric HPC System for Deep Learning", Feb. 18, 2019.
Lepikhin et al., "GShard: Scaling Giant Models with Conditional Computation and Automatic Sharding", Jun. 30, 2020.
Lewis et al., "BART: Denoising Sequence-to-Sequence Pre-Training for Natural Language Generation, Translation, and Comprehension", Oct. 29, 2019.
Li et al., "Evaluating Modern GPU Interconnect: PCle, NVLink, NV-SLI, NVSwitch and GPUDirect", Mar. 11, 2019.
McCandlish et al., "An Empirical Model of Large-Batch Training", Dec. 14, 2018.
Narang et al., "Mixed Precision Training", Feb. 15, 2018.
Narayanan et al., "Memory-Efficient Pipeline-Parallel DNN Training", Jul. 22, 2021.
Narayanan et al., "Efficient Large-Scale Language Model Training on GPU Clusters Using Megatron-LM", Aug. 23, 2021.
Niu et al., "HOGWILD !: A Lock-Free Approach to Parallelizing Stochastic Gradient Descent", Nov. 11, 2011.
Radford et al., "Improving Language Understanding by Generative Pre-Training", 12pages.
Radford et al., "Language Models are Unsupervised Multitask Learners", 24 pages.

Raffel et al., "Exploring the Limits of Transfer Learning with a Unified Text-to-Text Transformer", Journal of Machine earning Research 21, Jul. 28, 2020.
Rajbhandari et al., "ZeRO: Memory Optimizations Toward Training Trillion Parameter Models", May 13, 2020.
Rajbhandari et al., "ZeRO-Infinity: Breaking the GPU Memory Wall for Extreme Scale Deep Learning", Apr. 16, 2021.
Ren et al., "ZeRO-Offload: Democratizing Billion-Scale Model Training", Jan. 18, 2021.
Shallue et al., "Measuring the Effects of Data Parallelism on Neural Network Training", Journal of Machine Learning Research 20, Jul. 19, 2019.
Shoeybi et al., "Megatron-LM: Training Multi-Billion Parameter Language Models Using Model Parallelism", Mar. 13, 2020.
Smith et al., "Don't Decay The Learning Rate, Increase The Batch Size", Feb. 24, 2018.
Stich et al., "Critical Parameters for Scalable Distributed Learning with Large Batches and Asynchronous Updates", Mar. 3, 2021.
Stich et al., "Sparsified SGD with Memory", Nov. 28, 2018.
Tang et al., "1-bit Adam: Communication Efficient Large-Scale Training with Adam's Convergence Speed", Jun. 29, 2021.
Vaswani et al., "Attention Is All You Need", Dec. 6, 2017.
Yang et al., "XLNet: Generalized Autoregressive Pretraining for Language Understanding", Jan. 2, 2020.
"Solutions for the Data Center", NVIDIA, 5 pages.
"Visual intuition on ring-Allreduce for distributed Deep Learning", Towards Data Science, Aug. 1, 2019, 8 pages.
NVIDIA / Megatron-LM, Github, https://github.com/NVIDIA/Megatron-LM, downloaded Apr. 27, 2022.
Beaumont et al., "Optimal GPU-CPU Offloading Strategies for Deep Neural Network Training", HAL open science, Oct. 21, 2019, 28 pages.
Xue et al., "mT5: A Massively Multilingual Pre-trained Text-to-Text Transformer", Mar. 11, 2021.
Tay et al., "Efficient Transformers: A Survey", Mar. 14, 2022.
Gale et al., "Sparse GPU Kernels for Deep Learning", Aug. 31, 2020.
Zaheer et al., "Big Bird: Transformers for Longer Sequences", Jan. 8, 2021.
Beltagy et al., "Longformer: The Long-Document Transformer", Dec. 2, 2020.
Child et al., "Generating Long Sequences with Sparse Transformers", Apr. 23, 2019.
Li et al., "Train Large, Then Compress: Rethinking Model Size for Efficient Training and Inference of Transformers", Jun. 23, 2020.

* cited by examiner

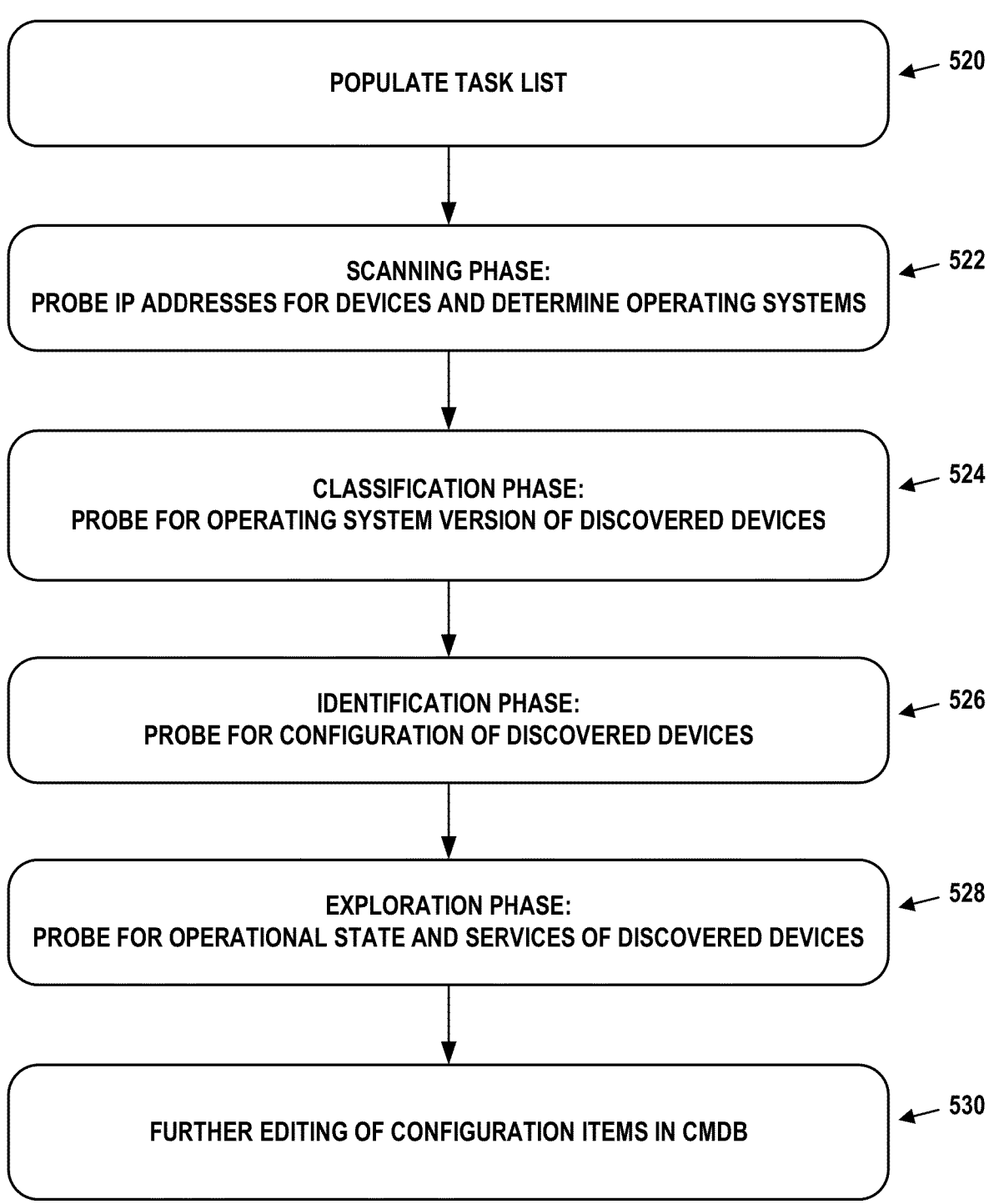

POPULATE TASK LIST ← 520

SCANNING PHASE:
PROBE IP ADDRESSES FOR DEVICES AND DETERMINE OPERATING SYSTEMS ← 522

CLASSIFICATION PHASE:
PROBE FOR OPERATING SYSTEM VERSION OF DISCOVERED DEVICES ← 524

IDENTIFICATION PHASE:
PROBE FOR CONFIGURATION OF DISCOVERED DEVICES ← 526

EXPLORATION PHASE:
PROBE FOR OPERATIONAL STATE AND SERVICES OF DISCOVERED DEVICES ← 528

FURTHER EDITING OF CONFIGURATION ITEMS IN CMDB ← 530

Non-Layered Gradient Accumulation

| COMPUTE | 0a | 0b | 0c | 0d | 0D | 0C | 0B | 0A | 1a | 1b | 1c | 1d | 1D | 1C | 1B | 1A | 2a | 2b | 2c | 2d | 2D | 2C | 2B | 2A | 3a | 3b | 3c | 3d | 3D | 3C | 3B | 3A |
| NETWORK | | | | | | | | | | | | | | | | REDUCE |

Layered Gradient Accumulation

| COMPUTE | 0a | 1a | 2a | 3a | 0b | 1b | 2b | 3b | 0c | 1c | 2c | 3c | 0d | 1d | 2d | 3d | 0D | 1D | 2D | 3D | 0C | 1C | 2C | 3C | 0B | 1B | 2B | 3B | 0A | 1A | 2A | 3A |
| NETWORK | | | | | | | | | | | | | | | | REDUCE |

FIG. 7

Non-Layered Gradient Accumulation

| COMPUTE | 0a | 0b | 0c | 0d | 0D | 0C | 0B | 0A | 1a | 1b | 1c | 1d | 1D | 1C | 1B | 1A | 2a | 2b | 2c | 2d | 2D | 2C | 2B | 2A | 3a | 3b | 3c | 3d | 3D | 3C | 3B | 3A |
| NETWORK | b | c | d | c | D | b | C | a | B | b | b | A | c | d | c | D | b | C | a | B | b | b | A | c | d | c | D | b | C | a | B | b | b | A |

Layered Gradient Accumulation

| COMPUTE | 0a | 1a | 2a | 3a | 0b | 1b | 2b | 3b | 0c | 1c | 2c | 3c | 0d | 1d | 2d | 3d | 0D | 1D | 2D | 3D | 0C | 1C | 2C | 3C | 0B | 1B | 2B | 3B | 0A | 1A | 2A | 3A |
| NETWORK | b | c | d | c | D | b | C | a | B | A |

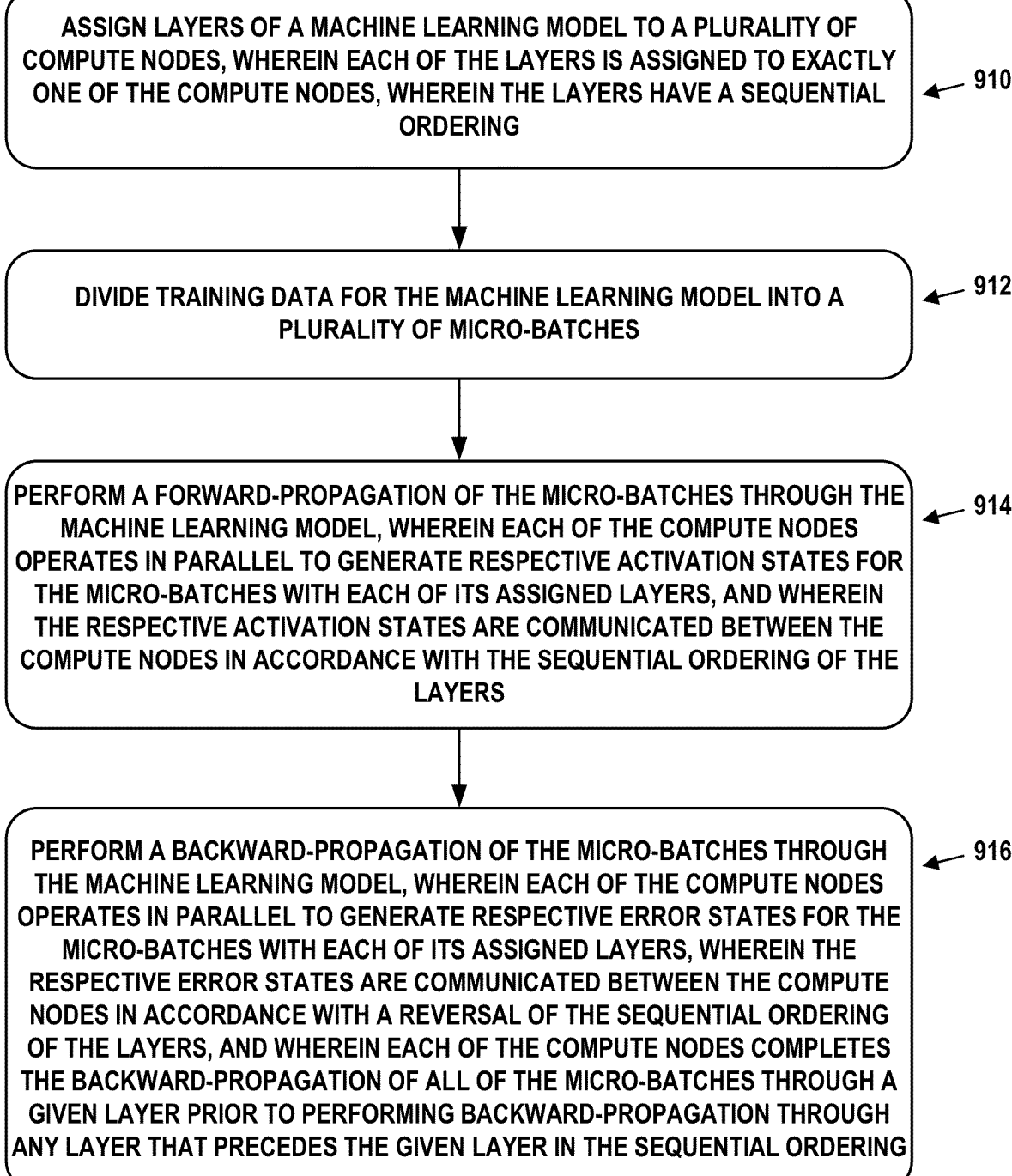

ASSIGN LAYERS OF A MACHINE LEARNING MODEL TO A PLURALITY OF COMPUTE NODES, WHEREIN EACH OF THE LAYERS IS ASSIGNED TO EXACTLY ONE OF THE COMPUTE NODES, WHEREIN THE LAYERS HAVE A SEQUENTIAL ORDERING ◄— 910

DIVIDE TRAINING DATA FOR THE MACHINE LEARNING MODEL INTO A PLURALITY OF MICRO-BATCHES ◄— 912

PERFORM A FORWARD-PROPAGATION OF THE MICRO-BATCHES THROUGH THE MACHINE LEARNING MODEL, WHEREIN EACH OF THE COMPUTE NODES OPERATES IN PARALLEL TO GENERATE RESPECTIVE ACTIVATION STATES FOR THE MICRO-BATCHES WITH EACH OF ITS ASSIGNED LAYERS, AND WHEREIN THE RESPECTIVE ACTIVATION STATES ARE COMMUNICATED BETWEEN THE COMPUTE NODES IN ACCORDANCE WITH THE SEQUENTIAL ORDERING OF THE LAYERS ◄— 914

PERFORM A BACKWARD-PROPAGATION OF THE MICRO-BATCHES THROUGH THE MACHINE LEARNING MODEL, WHEREIN EACH OF THE COMPUTE NODES OPERATES IN PARALLEL TO GENERATE RESPECTIVE ERROR STATES FOR THE MICRO-BATCHES WITH EACH OF ITS ASSIGNED LAYERS, WHEREIN THE RESPECTIVE ERROR STATES ARE COMMUNICATED BETWEEN THE COMPUTE NODES IN ACCORDANCE WITH A REVERSAL OF THE SEQUENTIAL ORDERING OF THE LAYERS, AND WHEREIN EACH OF THE COMPUTE NODES COMPLETES THE BACKWARD-PROPAGATION OF ALL OF THE MICRO-BATCHES THROUGH A GIVEN LAYER PRIOR TO PERFORMING BACKWARD-PROPAGATION THROUGH ANY LAYER THAT PRECEDES THE GIVEN LAYER IN THE SEQUENTIAL ORDERING ◄— 916

FIG. 9

Figure 10:
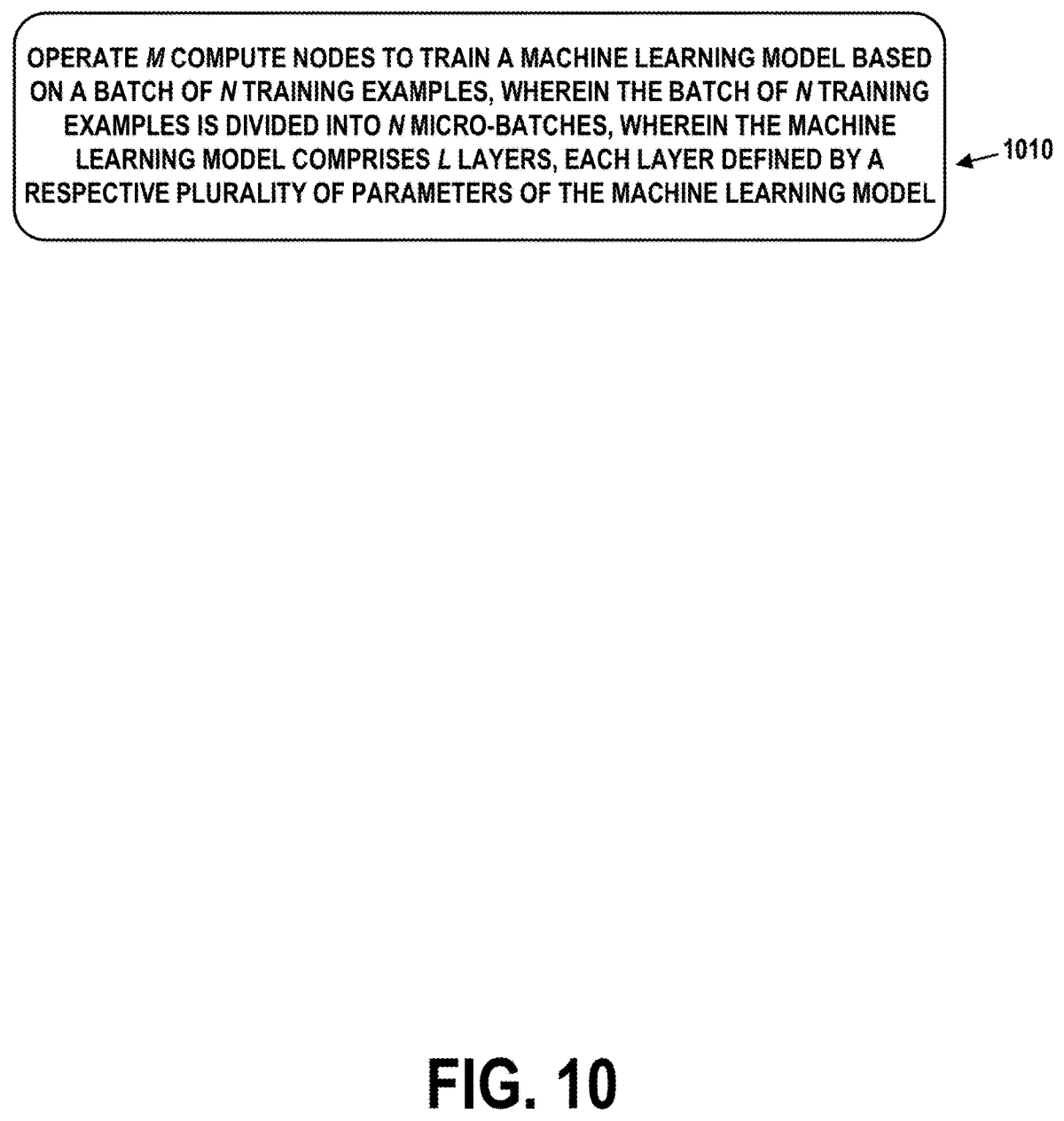

OPERATE *M* COMPUTE NODES TO TRAIN A MACHINE LEARNING MODEL BASED ON A BATCH OF *N* TRAINING EXAMPLES, WHEREIN THE BATCH OF *N* TRAINING EXAMPLES IS DIVIDED INTO *N* MICRO-BATCHES, WHEREIN THE MACHINE LEARNING MODEL COMPRISES *L* LAYERS, EACH LAYER DEFINED BY A RESPECTIVE PLURALITY OF PARAMETERS OF THE MACHINE LEARNING MODEL

LAYERED GRADIENT ACCUMULATION AND MODULAR PIPELINE PARALLELISM FOR IMPROVED TRAINING OF MACHINE LEARNING MODELS

CROSS-REFERENCE TO RELATED APPLICATION

The present application claims priority to Provisional Patent Application No. 63/194,389, filed with the U.S. Patent and Trademark Office on May 28, 2021, the contents of which are hereby incorporated by reference.

SUMMARY

A first example embodiment may involve a computer-implemented method including: (i) assigning layers of a machine learning model to a plurality of compute nodes, wherein each of the layers is assigned to exactly one of the compute nodes, wherein the layers have a sequential ordering; (ii) dividing training data for the machine learning model into a plurality of micro-batches; (iii) performing a forward-propagation of the micro-batches through the machine learning model, wherein each of the compute nodes operates in parallel to generate respective activation states for the micro-batches with each of its assigned layers, and wherein the respective activation states are communicated between the compute nodes in accordance with the sequential ordering of the layers; and (iv) performing a backward-propagation of the micro-batches through the machine learning model, wherein each of the compute nodes operates in parallel to generate respective error states for the micro-batches with each of its assigned layers, wherein the respective error states are communicated between the compute nodes in accordance with a reversal of the sequential ordering of the layers, and wherein each of the compute nodes completes the backward-propagation of all of the micro-batches through a given layer prior to performing backward-propagation through any layer that precedes the given layer in the sequential ordering.

A second example embodiment may involve a computer-implemented method including: operating M compute nodes to train a machine learning model based on a batch of N training examples, wherein the batch of N training examples is divided into n micro-batches, wherein the machine learning model comprises L layers, each layer defined by a respective plurality of parameters of the machine learning model, wherein operating the M compute nodes to train the machine learning model based on the batch of N training examples comprises updating the parameters of the machine learning model by: (i) sequentially applying, by a first compute node of the M compute nodes, each of the micro-batches to a first layer of the L layers to generate respective first-layer activation states; (ii) transmitting, from the first compute node to a second compute node of the M compute nodes, the first-layer activation states; (iii) sequentially applying, by the second compute node, each of the first-layer activation states to a second layer of the L layers to generate respective second-layer activation states for each of the micro-batches, wherein the second compute node applying a particular one of the first layer activation states to the second layer at least partially overlaps in time with the first compute node transmitting a subsequent one of the first layer activation states to the second compute node; (iv) transmitting, from an $M^{th}$ compute node of the M compute nodes to the first compute node, $M^{th}$-layer activation states for each of the micro-batches; (v) sequentially applying, by the first compute node subsequent to generating the first-layer activation states, each of the $M^{th}$-layer activation states to an $(M+1)^{th}$ layer of the L layers to generate respective $(M+1)^{th}$-layer activation states for each of the micro-batches; (vi) transmitting, from an $(M-1)^{th}$ compute node of the M compute nodes to the $M^{th}$ compute node, $(L-1)^{th}$-layer activation states for each of the micro-batches; (vii) sequentially applying, by the $M^{th}$ compute node, each of the $(L-1)^{th}$-layer activation states to an $L^{th}$ layer of the L layers to generate respective $L^{th}$-layer activation states for each of the micro-batches; (viii) based on the $L^{th}$-layer activation states, generating respective $L^{th}$-layer error states for each of the micro-batches; (ix) sequentially applying, by the $M^{th}$ compute node, each of the $L^{th}$-layer error states to the $L^{th}$ layer to generate respective $(L-1)^{th}$-layer error states for each of the micro-batches and respective $L^{th}$-layer parameter update information for each of the micro-batches; (x) transmitting, from the $M^{th}$ compute node to the $(M-1)^{th}$ compute node, the $(L-1)^{th}$-layer error states; (xi) sequentially applying, by the $(M-1)^{th}$ compute node, each of the $(L-1)^{th}$-layer error states to the $(L-1)^{th}$-layer to generate respective $(L-2)^{th}$-layer error states for each of the micro-batches and respective $(L-1)^{th}$-layer parameter update information for each of the micro-batches, wherein the $(M-1)^{th}$ compute node applying a particular one of the $(L-1)^{th}$-layer error states to the $(L-1)^{th}$-layer at least partially overlaps in time with the $M^{th}$ compute node transmitting a subsequent one of the $(L-1)^{th}$-layer error states to the $(M-1)^{th}$ compute node; (xii) transmitting, from the first compute node to the $M^{th}$ compute node, $(L-M)^{th}$-layer error states for each of the micro-batches; and (xiii) sequentially applying, by the $M^{th}$ compute node subsequent to generating the $(L-1)^{th}$-layer error states, each of the $(L-M)^{th}$ layer error states to an $(L-M)^{th}$ layer of the L layers to generate respective $(L-M-1)^{th}$-layer activation states for each of the micro-batches and respective $(L-M-1)^{th}$-layer parameter update information for each of the micro-batches.

In a third example embodiment, an article of manufacture may include a non-transitory computer-readable medium, having stored thereon program instructions that, upon execution by a computing system, cause the computing system to perform operations in accordance with the first and/or second example embodiment.

In a fourth example embodiment, a computing system may include at least one processor, as well as memory and program instructions. The program instructions may be stored in the memory, and upon execution by the at least one processor, cause the computing system to perform operations in accordance with the first and/or second example embodiment.

In a fifth example embodiment, a system may include various means for carrying out each of the operations of the first and/or second example embodiment.

These, as well as other embodiments, aspects, advantages, and alternatives, will become apparent to those of ordinary skill in the art by reading the following detailed description, with reference where appropriate to the accompanying drawings. Further, this summary and other descriptions and figures provided herein are intended to illustrate embodiments by way of example only and, as such, that numerous variations are possible. For instance, structural elements and process steps can be rearranged, combined, distributed, eliminated, or otherwise changed, while remaining within the scope of the embodiments as claimed.

BRIEF DESCRIPTION OF THE DRAWINGS

FIG. 5B is a flow chart, in accordance with example embodiments.

FIG. 6 depicts an example schedule of computation and communication during training of a model, in accordance with example embodiments.

FIG. 7 depicts an example schedule of computation and communication during training of a model, in accordance with example embodiments.

FIG. 9 is a flow chart, in accordance with example embodiments.

FIG. 10 is a flow chart, in accordance with example embodiments.

DETAILED DESCRIPTION

Figure 1:
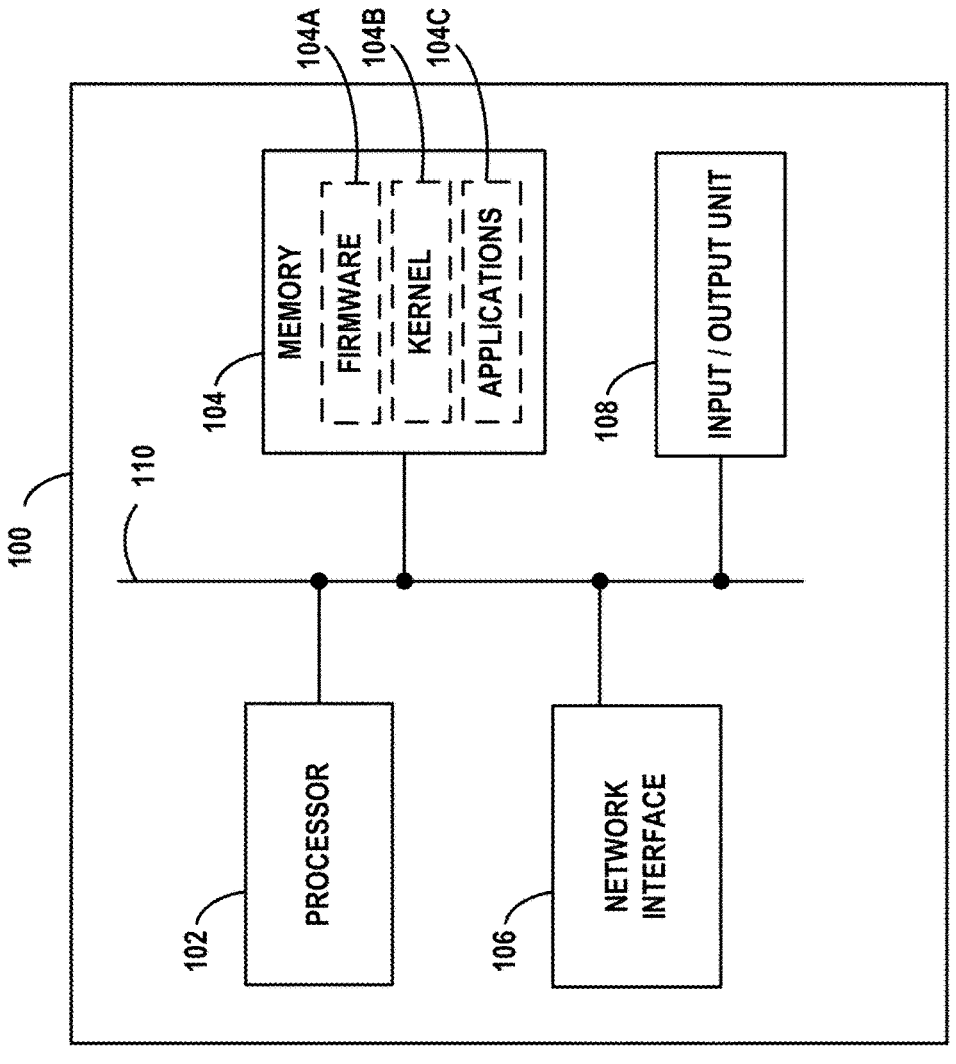
FIG. 1 illustrates a schematic drawing of a computing device, in accordance with example embodiments.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Thus, other embodiments can be utilized and other changes can be made without departing from the scope of the subject matter presented herein.

Accordingly, the example embodiments described herein are not meant to be limiting. It will be readily understood that the aspects of the present disclosure, as generally described herein, and illustrated in the figures, can be arranged, substituted, combined, separated, and designed in a wide variety of different configurations. For example, the separation of features into "client" and "server" components may occur in a number of ways.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

I. INTRODUCTION

A large enterprise is a complex entity with many interrelated operations. Some of these are found across the enterprise, such as human resources (HR), supply chain, information technology (IT), and finance. However, each enterprise also has its own unique operations that provide essential capabilities and/or create competitive advantages.

To support widely-implemented operations, enterprises typically use off-the-shelf software applications, such as customer relationship management (CRM) and human capital management (HCM) packages. However, they may also need custom software applications to meet their own unique requirements. A large enterprise often has dozens or hundreds of these custom software applications. Nonetheless, the advantages provided by the embodiments herein are not limited to large enterprises and may be applicable to an enterprise, or any other type of organization, of any size.

Many such software applications are developed by individual departments within the enterprise. These range from simple spreadsheets to custom-built software tools and databases. But the proliferation of siloed custom software applications has numerous disadvantages. It negatively impacts an enterprise's ability to run and grow its operations, innovate, and meet regulatory requirements. The enterprise may find it difficult to integrate, streamline, and enhance its operations due to lack of a single system that unifies its subsystems and data.

To efficiently create custom applications, enterprises would benefit from a remotely-hosted application platform that eliminates unnecessary development complexity. The goal of such a platform would be to reduce time-consuming, repetitive application development tasks so that software engineers and individuals in other roles can focus on developing unique, high-value features.

In order to achieve this goal, the concept of Application Platform as a Service (aPaaS) is introduced, to intelligently automate workflows throughout the enterprise. An aPaaS system is hosted remotely from the enterprise, but may access data, applications, and services within the enterprise by way of secure connections. Such an aPaaS system may have a number of advantageous capabilities and characteristics. These advantages and characteristics may be able to improve the enterprise's operations and workflows for IT, HR, CRM, customer service, application development, and security.

The aPaaS system may support development and execution of model-view-controller (MVC) applications. MVC applications divide their functionality into three interconnected parts (model, view, and controller) in order to isolate representations of information from the manner in which the information is presented to the user, thereby allowing for efficient code reuse and parallel development. These applications may be web-based, and offer create, read, update, and delete (CRUD) capabilities. This allows new applications to be built on a common application infrastructure.

The aPaaS system may support standardized application components, such as a standardized set of widgets for graphical user interface (GUI) development. In this way, applications built using the aPaaS system have a common look and feel. Other software components and modules may be standardized as well. In some cases, this look and feel can be branded or skinned with an enterprise's custom logos and/or color schemes.

The aPaaS system may support the ability to configure the behavior of applications using metadata. This allows application behaviors to be rapidly adapted to meet specific needs. Such an approach reduces development time and increases flexibility. Further, the aPaaS system may support GUI tools that facilitate metadata creation and management, thus reducing errors in the metadata.

The aPaaS system may support clearly-defined interfaces between applications, so that software developers can avoid unwanted inter-application dependencies. Thus, the aPaaS system may implement a service layer in which persistent state information and other data are stored.

The aPaaS system may support a rich set of integration features so that the applications thereon can interact with legacy applications and third-party applications. For instance, the aPaaS system may support a custom employee-onboarding system that integrates with legacy HR, IT, and accounting systems.

The aPaaS system may support enterprise-grade security. Furthermore, since the aPaaS system may be remotely hosted, it should also utilize security procedures when it interacts with systems in the enterprise or third-party networks and services hosted outside of the enterprise. For example, the aPaaS system may be configured to share data amongst the enterprise and other parties to detect and identify common security threats.

Other features, functionality, and advantages of an aPaaS system may exist. This description is for purpose of example and is not intended to be limiting.

As an example of the aPaaS development process, a software developer may be tasked to create a new application using the aPaaS system. First, the developer may define the data model, which specifies the types of data that the application uses and the relationships therebetween. Then, via a GUI of the aPaaS system, the developer enters (e.g., uploads) the data model. The aPaaS system automatically creates all of the corresponding database tables, fields, and relationships, which can then be accessed via an object-oriented services layer.

In addition, the aPaaS system can also build a fully-functional MVC application with client-side interfaces and server-side CRUD logic. This generated application may serve as the basis of further development for the user. Advantageously, the developer does not have to spend a large amount of time on basic application functionality. Further, since the application may be web-based, it can be accessed from any Internet-enabled client device. Alternatively or additionally, a local copy of the application may be able to be accessed, for instance, when Internet service is not available.

The aPaaS system may also support a rich set of predefined functionality that can be added to applications. These features include support for searching, email, templating, workflow design, reporting, analytics, social media, scripting, mobile-friendly output, and customized GUIs.

Such an aPaaS system may represent a GUI in various ways. For example, a server device of the aPaaS system may generate a representation of a GUI using a combination of HTML, and JAVASCRIPT®. The JAVASCRIPT® may include client-side executable code, server-side executable code, or both. The server device may transmit or otherwise provide this representation to a client device for the client device to display on a screen according to its locally-defined look and feel. Alternatively, a representation of a GUI may take other forms, such as an intermediate form (e.g., JAVA® byte-code) that a client device can use to directly generate graphical output therefrom. Other possibilities exist.

Further, user interaction with GUI elements, such as buttons, menus, tabs, sliders, checkboxes, toggles, etc. may be referred to as "selection", "activation", or "actuation"

thereof. These terms may be used regardless of whether the GUI elements are interacted with by way of keyboard, pointing device, touchscreen, or another mechanism.

An aPaaS architecture is particularly powerful when integrated with an enterprise's network and used to manage such a network. The following embodiments describe architectural and functional aspects of example aPaaS systems, as well as the features and advantages thereof.

II. EXAMPLE COMPUTING DEVICES AND CLOUD-BASED COMPUTING ENVIRONMENTS

FIG. 1 is a simplified block diagram exemplifying a computing device 100, illustrating some of the components that could be included in a computing device arranged to operate in accordance with the embodiments herein. Computing device 100 could be a client device (e.g., a device actively operated by a user), a server device (e.g., a device that provides computational services to client devices), or some other type of computational platform. Some server devices may operate as client devices from time to time in order to perform particular operations, and some client devices may incorporate server features.

In this example, computing device 100 includes processor 102, memory 104, network interface 106, and input/output unit 108, all of which may be coupled by system bus 110 or a similar mechanism. In some embodiments, computing device 100 may include other components and/or peripheral devices (e.g., detachable storage, printers, and so on).

Processor 102 may be one or more of any type of computer processing element, such as a central processing unit (CPU), a co-processor (e.g., a mathematics, graphics, or encryption co-processor), a digital signal processor (DSP), a network processor, and/or a form of integrated circuit or controller that performs processor operations. In some cases, processor 102 may be one or more single-core processors. In other cases, processor 102 may be one or more multi-core processors with multiple independent processing units. Processor 102 may also include register memory for temporarily storing instructions being executed and related data, as well as cache memory for temporarily storing recently-used instructions and data.

Memory 104 may be any form of computer-usable memory, including but not limited to random access memory (RAM), read-only memory (ROM), and non-volatile memory (e.g., flash memory, hard disk drives, solid state drives, compact discs (CDs), digital video discs (DVDs), and/or tape storage). Thus, memory 104 represents both main memory units, as well as long-term storage. Other types of memory may include biological memory.

Memory 104 may store program instructions and/or data on which program instructions may operate. By way of example, memory 104 may store these program instructions on a non-transitory, computer-readable medium, such that the instructions are executable by processor 102 to carry out any of the methods, processes, or operations disclosed in this specification or the accompanying drawings.

As shown in FIG. 1, memory 104 may include firmware 104A, kernel 104B, and/or applications 104C. Firmware 104A may be program code used to boot or otherwise initiate some or all of computing device 100. Kernel 104B may be an operating system, including modules for memory management, scheduling, and management of processes, input/output, and communication. Kernel 104B may also include device drivers that allow the operating system to communicate with the hardware modules (e.g., memory units, networking interfaces, ports, and buses) of computing device 100. Applications 104C may be one or more user-space software programs, such as web browsers or email clients, as well as any software libraries used by these programs. Memory 104 may also store data used by these programs and other programs and applications.

Network interface 106 may take the form of one or more wireline interfaces, such as Ethernet (e.g., Fast Ethernet, Gigabit Ethernet, and so on). Network interface 106 may also support communication over one or more non-Ethernet media, such as coaxial cables or power lines, or over wide-area media, such as Synchronous Optical Networking (SONET) or digital subscriber line (DSL) technologies. Network interface 106 may additionally take the form of one or more wireless interfaces, such as IEEE 802.11 (Wifi), BLUETOOTH®, global positioning system (GPS), or a wide-area wireless interface. However, other forms of physical layer interfaces and other types of standard or proprietary communication protocols may be used over network interface 106. Furthermore, network interface 106 may comprise multiple physical interfaces. For instance, some embodiments of computing device 100 may include Ethernet, BLUETOOTH®, and Wifi interfaces.

Input/output unit 108 may facilitate user and peripheral device interaction with computing device 100. Input/output unit 108 may include one or more types of input devices, such as a keyboard, a mouse, a touch screen, and so on. Similarly, input/output unit 108 may include one or more types of output devices, such as a screen, monitor, printer, and/or one or more light emitting diodes (LEDs). Additionally or alternatively, computing device 100 may communicate with other devices using a universal serial bus (USB) or high-definition multimedia interface (HDMI) port interface, for example.

In some embodiments, one or more computing devices like computing device 100 may be deployed to support an aPaaS architecture. The exact physical location, connectivity, and configuration of these computing devices may be unknown and/or unimportant to client devices. Accordingly, the computing devices may be referred to as "cloud-based" devices that may be housed at various remote data center locations.

Figure 2:
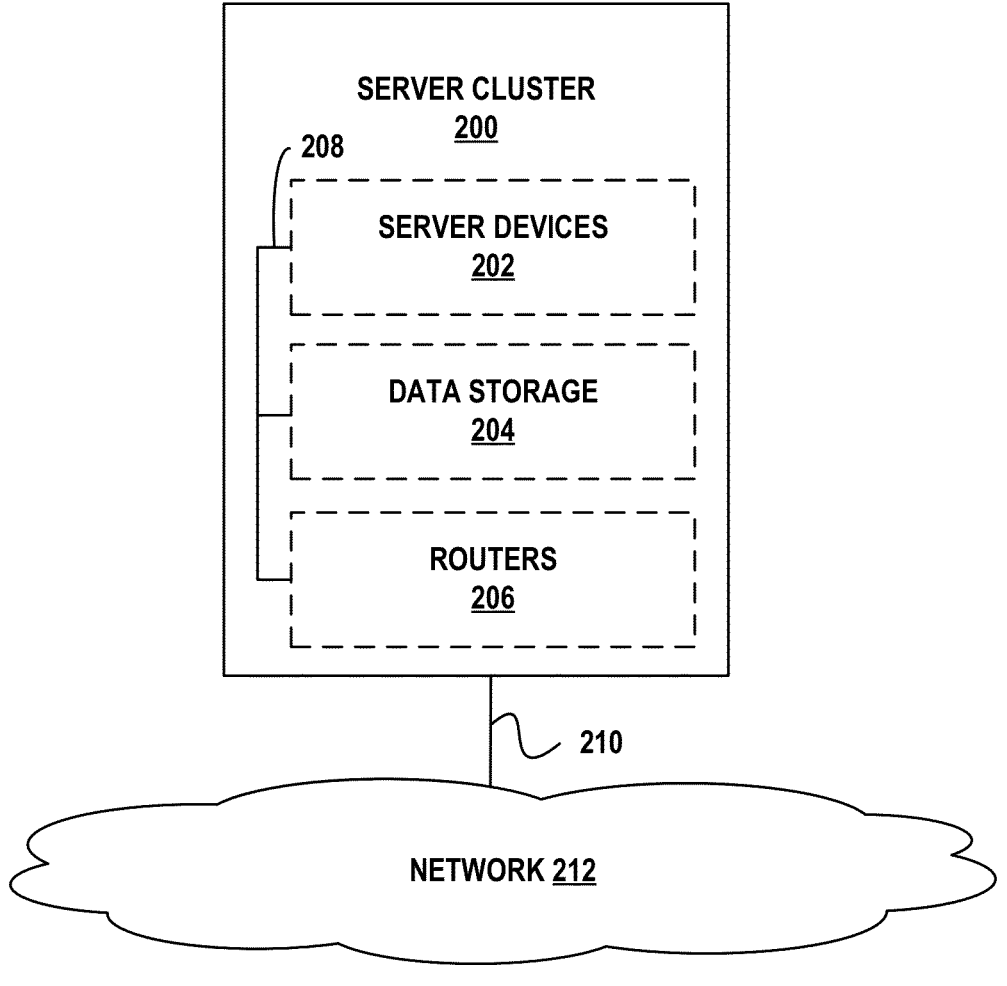
FIG. 2 illustrates a schematic drawing of a server device cluster, in accordance with example embodiments.

FIG. 2 depicts a cloud-based server cluster 200 in accordance with example embodiments. In FIG. 2, operations of a computing device (e.g., computing device 100) may be distributed between server devices 202, data storage 204, and routers 206, all of which may be connected by local cluster network 208. The number of server devices 202, data storages 204, and routers 206 in server cluster 200 may depend on the computing task(s) and/or applications assigned to server cluster 200.

For example, server devices 202 can be configured to perform various computing tasks of computing device 100. Thus, computing tasks can be distributed among one or more of server devices 202. To the extent that these computing tasks can be performed in parallel, such a distribution of tasks may reduce the total time to complete these tasks and return a result. For purposes of simplicity, both server cluster 200 and individual server devices 202 may be referred to as a "server device." This nomenclature should be understood to imply that one or more distinct server devices, data storage devices, and cluster routers may be involved in server device operations.

Data storage 204 may be data storage arrays that include drive array controllers configured to manage read and write access to groups of hard disk drives and/or solid state drives. The drive array controllers, alone or in conjunction with server devices 202, may also be configured to manage backup or redundant copies of the data stored in data storage 204 to protect against drive failures or other types of failures that prevent one or more of server devices 202 from accessing units of data storage 204. Other types of memory aside from drives may be used.

Routers 206 may include networking equipment configured to provide internal and external communications for server cluster 200. For example, routers 206 may include one or more packet-switching and/or routing devices (including switches and/or gateways) configured to provide (i) network communications between server devices 202 and data storage 204 via local cluster network 208, and/or (ii) network communications between server cluster 200 and other devices via communication link 210 to network 212.

Additionally, the configuration of routers 206 can be based at least in part on the data communication requirements of server devices 202 and data storage 204, the latency and throughput of the local cluster network 208, the latency, throughput, and cost of communication link 210, and/or other factors that may contribute to the cost, speed, fault-tolerance, resiliency, efficiency, and/or other design goals of the system architecture.

As a possible example, data storage 204 may include any form of database, such as a structured query language (SQL) database. Various types of data structures may store the information in such a database, including but not limited to tables, arrays, lists, trees, and tuples. Furthermore, any databases in data storage 204 may be monolithic or distributed across multiple physical devices.

Server devices 202 may be configured to transmit data to and receive data from data storage 204. This transmission and retrieval may take the form of SQL queries or other types of database queries, and the output of such queries, respectively. Additional text, images, video, and/or audio may be included as well. Furthermore, server devices 202 may organize the received data into web page or web application representations. Such a representation may take the form of a markup language, such as the hypertext markup language (HTML), the extensible markup language (XML), or some other standardized or proprietary format. Moreover, server devices 202 may have the capability of executing various types of computerized scripting languages, such as but not limited to Perl, Python, PHP Hypertext Preprocessor (PHP), Active Server Pages (ASP), JAVASCRIPT®, and so on. Computer program code written in these languages may facilitate the providing of web pages to client devices, as well as client device interaction with the web pages. Alternatively or additionally, JAVA® may be used to facilitate generation of web pages and/or to provide web application functionality.

III. EXAMPLE REMOTE NETWORK MANAGEMENT ARCHITECTURE

Figure 3:
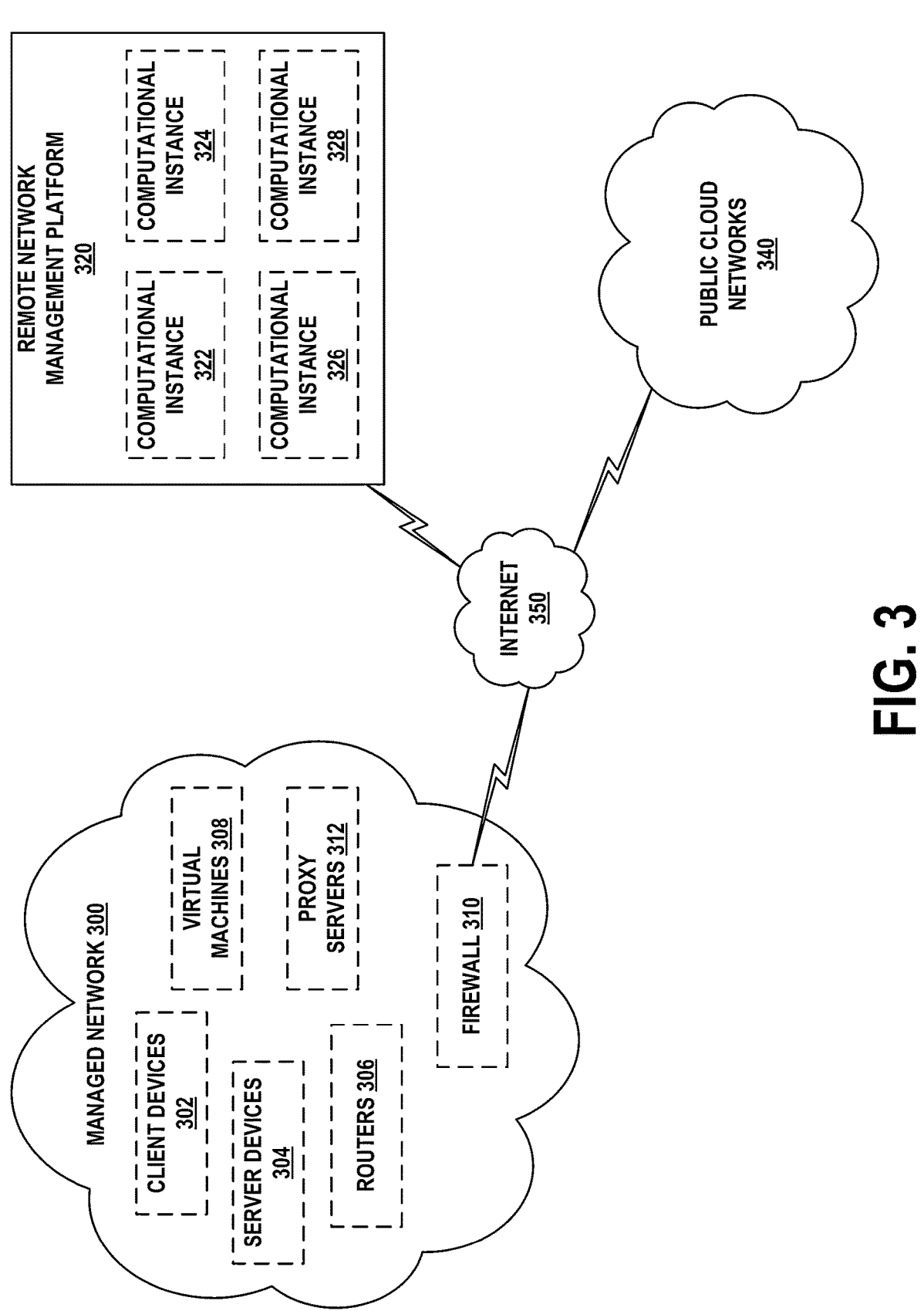
FIG. 3 depicts a remote network management architecture, in accordance with example embodiments.

FIG. 3 depicts a remote network management architecture, in accordance with example embodiments. This architecture includes three main components—managed network 300, remote network management platform 320, and public cloud networks 340—all connected by way of Internet 350.

A. Managed Networks

Managed network 300 may be, for example, an enterprise network used by an entity for computing and communications tasks, as well as storage of data. Thus, managed network 300 may include client devices 302, server devices 304, routers 306, virtual machines 308, firewall 310, and/or proxy servers 312. Client devices 302 may be embodied by computing device 100, server devices 304 may be embodied by computing device 100 or server cluster 200, and routers 306 may be any type of router, switch, or gateway.

Virtual machines 308 may be embodied by one or more of computing device 100 or server cluster 200. In general, a virtual machine is an emulation of a computing system, and mimics the functionality (e.g., processor, memory, and communication resources) of a physical computer. One physical computing system, such as server cluster 200, may support up to thousands of individual virtual machines. In some embodiments, virtual machines 308 may be managed by a centralized server device or application that facilitates allocation of physical computing resources to individual virtual machines, as well as performance and error reporting. Enterprises often employ virtual machines in order to allocate computing resources in an efficient, as needed fashion. Providers of virtualized computing systems include VMWARE® and MICROSOFT®.

Firewall 310 may be one or more specialized routers or server devices that protect managed network 300 from unauthorized attempts to access the devices, applications, and services therein, while allowing authorized communication that is initiated from managed network 300. Firewall 310 may also provide intrusion detection, web filtering, virus scanning, application-layer gateways, and other applications or services. In some embodiments not shown in FIG. 3, managed network 300 may include one or more virtual private network (VPN) gateways with which it communicates with remote network management platform 320 (see below).

Managed network 300 may also include one or more proxy servers 312. An embodiment of proxy servers 312 may be a server application that facilitates communication and movement of data between managed network 300, remote network management platform 320, and public cloud networks 340. In particular, proxy servers 312 may be able to establish and maintain secure communication sessions with one or more computational instances of remote network management platform 320. By way of such a session, remote network management platform 320 may be able to discover and manage aspects of the architecture and configuration of managed network 300 and its components. Possibly with the assistance of proxy servers 312, remote network management platform 320 may also be able to discover and manage aspects of public cloud networks 340 that are used by managed network 300.

Firewalls, such as firewall 310, typically deny all communication sessions that are incoming by way of Internet 350, unless such a session was ultimately initiated from behind the firewall (i.e., from a device on managed network 300) or the firewall has been explicitly configured to support the session. By placing proxy servers 312 behind firewall 310 (e.g., within managed network 300 and protected by firewall 310), proxy servers 312 may be able to initiate these communication sessions through firewall 310. Thus, firewall 310 might not have to be specifically configured to support incoming sessions from remote network management platform 320, thereby avoiding potential security risks to managed network 300.

In some cases, managed network 300 may consist of a few devices and a small number of networks. In other deployments, managed network 300 may span multiple physical locations and include hundreds of networks and hundreds of thousands of devices. Thus, the architecture depicted in FIG. 3 is capable of scaling up or down by orders of magnitude.

Furthermore, depending on the size, architecture, and connectivity of managed network 300, a varying number of proxy servers 312 may be deployed therein. For example, each one of proxy servers 312 may be responsible for communicating with remote network management platform 320 regarding a portion of managed network 300. Alternatively or additionally, sets of two or more proxy servers may be assigned to such a portion of managed network 300 for purposes of load balancing, redundancy, and/or high availability.

B. Remote Network Management Platforms

Remote network management platform 320 is a hosted environment that provides aPaaS services to users, particularly to the operator of managed network 300. These services may take the form of web-based portals, for example, using the aforementioned web-based technologies. Thus, a user can securely access remote network management platform 320 from, for example, client devices 302, or potentially from a client device outside of managed network 300. By way of the web-based portals, users may design, test, and deploy applications, generate reports, view analytics, and perform other tasks. Remote network management platform 320 may also be referred to as a multi-application platform.

As shown in FIG. 3, remote network management platform 320 includes four computational instances 322, 324, 326, and 328. Each of these computational instances may represent one or more server nodes operating dedicated copies of the aPaaS software and/or one or more database nodes. The arrangement of server and database nodes on physical server devices and/or virtual machines can be flexible and may vary based on enterprise needs. In combination, these nodes may provide a set of web portals, services, and applications (e.g., a wholly-functioning aPaaS system) available to a particular enterprise. In some cases, a single enterprise may use multiple computational instances.

For example, managed network 300 may be an enterprise customer of remote network management platform 320, and may use computational instances 322, 324, and 326. The reason for providing multiple computational instances to one customer is that the customer may wish to independently develop, test, and deploy its applications and services. Thus, computational instance 322 may be dedicated to application development related to managed network 300, computational instance 324 may be dedicated to testing these applications, and computational instance 326 may be dedicated to the live operation of tested applications and services. A computational instance may also be referred to as a hosted instance, a remote instance, a customer instance, or by some other designation. Any application deployed onto a computational instance may be a scoped application, in that its access to databases within the computational instance can be restricted to certain elements therein (e.g., one or more particular database tables or particular rows within one or more database tables).

For purposes of clarity, the disclosure herein refers to the arrangement of application nodes, database nodes, aPaaS software executing thereon, and underlying hardware as a "computational instance." Note that users may colloquially refer to the graphical user interfaces provided thereby as "instances." But unless it is defined otherwise herein, a "computational instance" is a computing system disposed within remote network management platform 320.

The multi-instance architecture of remote network management platform 320 is in contrast to conventional multi-tenant architectures, over which multi-instance architectures exhibit several advantages. In multi-tenant architectures, data from different customers (e.g., enterprises) are comingled in a single database. While these customers' data are separate from one another, the separation is enforced by the software that operates the single database. As a consequence, a security breach in this system may affect all customers' data, creating additional risk, especially for entities subject to governmental, healthcare, and/or financial regulation. Furthermore, any database operations that affect one customer will likely affect all customers sharing that database. Thus, if there is an outage due to hardware or software errors, this outage affects all such customers. Likewise, if the database is to be upgraded to meet the needs of one customer, it will be unavailable to all customers during the upgrade process. Often, such maintenance windows will be long, due to the size of the shared database.

In contrast, the multi-instance architecture provides each customer with its own database in a dedicated computing instance. This prevents comingling of customer data, and allows each instance to be independently managed. For example, when one customer's instance experiences an outage due to errors or an upgrade, other computational instances are not impacted. Maintenance down time is limited because the database only contains one customer's data. Further, the simpler design of the multi-instance architecture allows redundant copies of each customer database and instance to be deployed in a geographically diverse fashion. This facilitates high availability, where the live version of the customer's instance can be moved when faults are detected or maintenance is being performed.

In some embodiments, remote network management platform 320 may include one or more central instances, controlled by the entity that operates this platform. Like a computational instance, a central instance may include some number of application and database nodes disposed upon some number of physical server devices or virtual machines. Such a central instance may serve as a repository for specific configurations of computational instances as well as data that can be shared amongst at least some of the computational instances. For instance, definitions of common security threats that could occur on the computational instances, software packages that are commonly discovered on the computational instances, and/or an application store for applications that can be deployed to the computational instances may reside in a central instance. Computational instances may communicate with central instances by way of well-defined interfaces in order to obtain this data.

In order to support multiple computational instances in an efficient fashion, remote network management platform 320 may implement a plurality of these instances on a single hardware platform. For example, when the aPaaS system is implemented on a server cluster such as server cluster 200, it may operate virtual machines that dedicate varying amounts of computational, storage, and communication resources to instances. But full virtualization of server cluster 200 might not be necessary, and other mechanisms may be used to separate instances. In some examples, each instance may have a dedicated account and one or more dedicated databases on server cluster 200. Alternatively, a computational instance such as computational instance 322 may span multiple physical devices.

In some cases, a single server cluster of remote network management platform 320 may support multiple independent enterprises. Furthermore, as described below, remote network management platform 320 may include multiple server clusters deployed in geographically diverse data centers in order to facilitate load balancing, redundancy, and/or high availability.

C. Public Cloud Networks

Public cloud networks 340 may be remote server devices (e.g., a plurality of server clusters such as server cluster 200)

that can be used for outsourced computation, data storage, communication, and service hosting operations. These servers may be virtualized (i.e., the servers may be virtual machines). Examples of public cloud networks 340 may include AMAZON WEB SERVICES® and MICROSOFT® AZURE®. Like remote network management platform 320, multiple server clusters supporting public cloud networks 340 may be deployed at geographically diverse locations for purposes of load balancing, redundancy, and/or high availability.

Managed network 300 may use one or more of public cloud networks 340 to deploy applications and services to its clients and customers. For instance, if managed network 300 provides online music streaming services, public cloud networks 340 may store the music files and provide web interface and streaming capabilities. In this way, the enterprise of managed network 300 does not have to build and maintain its own servers for these operations.

Remote network management platform 320 may include modules that integrate with public cloud networks 340 to expose virtual machines and managed services therein to managed network 300. The modules may allow users to request virtual resources, discover allocated resources, and provide flexible reporting for public cloud networks 340. In order to establish this functionality, a user from managed network 300 might first establish an account with public cloud networks 340, and request a set of associated resources. Then, the user may enter the account information into the appropriate modules of remote network management platform 320. These modules may then automatically discover the manageable resources in the account, and also provide reports related to usage, performance, and billing.

D. Communication Support and Other Operations

Internet 350 may represent a portion of the global Internet. However, Internet 350 may alternatively represent a different type of network, such as a private wide-area or local-area packet-switched network.

Figure 4:
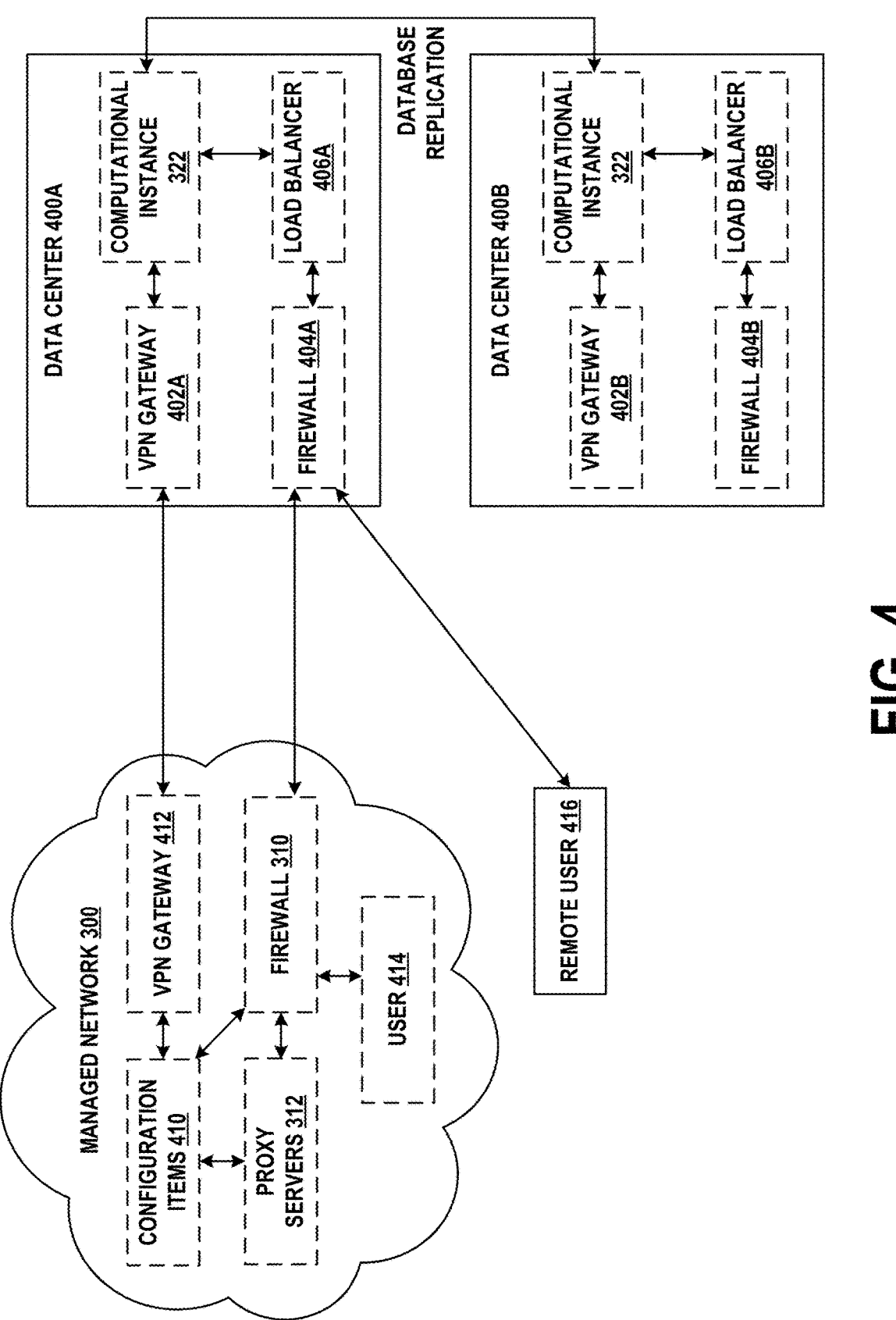
FIG. 4 depicts a communication environment involving a remote network management architecture, in accordance with example embodiments.

FIG. 4 further illustrates the communication environment between managed network 300 and computational instance 322, and introduces additional features and alternative embodiments. In FIG. 4, computational instance 322 is replicated, in whole or in part, across data centers 400A and 400B. These data centers may be geographically distant from one another, perhaps in different cities or different countries. Each data center includes support equipment that facilitates communication with managed network 300, as well as remote users.

In data center 400A, network traffic to and from external devices flows either through VPN gateway 402A or firewall 404A. VPN gateway 402A may be peered with VPN gateway 412 of managed network 300 by way of a security protocol such as Internet Protocol Security (IPSEC) or Transport Layer Security (TLS). Firewall 404A may be configured to allow access from authorized users, such as user 414 and remote user 416, and to deny access to unauthorized users. By way of firewall 404A, these users may access computational instance 322, and possibly other computational instances. Load balancer 406A may be used to distribute traffic amongst one or more physical or virtual server devices that host computational instance 322. Load balancer 406A may simplify user access by hiding the internal configuration of data center 400A, (e.g., computational instance 322) from client devices. For instance, if computational instance 322 includes multiple physical or virtual computing devices that share access to multiple databases, load balancer 406A may distribute network traffic and processing tasks across these computing devices and databases so that no one computing device or database is significantly busier than the others. In some embodiments, computational instance 322 may include VPN gateway 402A, firewall 404A, and load balancer 406A.

Data center 400B may include its own versions of the components in data center 400A. Thus, VPN gateway 402B, firewall 404B, and load balancer 406B may perform the same or similar operations as VPN gateway 402A, firewall 404A, and load balancer 406A, respectively. Further, by way of real-time or near-real-time database replication and/or other operations, computational instance 322 may exist simultaneously in data centers 400A and 400B.

Data centers 400A and 400B as shown in FIG. 4 may facilitate redundancy and high availability. In the configuration of FIG. 4, data center 400A is active and data center 400B is passive. Thus, data center 400A is serving all traffic to and from managed network 300, while the version of computational instance 322 in data center 400B is being updated in near-real-time. Other configurations, such as one in which both data centers are active, may be supported.

Should data center 400A fail in some fashion or otherwise become unavailable to users, data center 400B can take over as the active data center. For example, domain name system (DNS) servers that associate a domain name of computational instance 322 with one or more Internet Protocol (IP) addresses of data center 400A may re-associate the domain name with one or more IP addresses of data center 400B. After this re-association completes (which may take less than one second or several seconds), users may access computational instance 322 by way of data center 400B.

FIG. 4 also illustrates a possible configuration of managed network 300. As noted above, proxy servers 312 and user 414 may access computational instance 322 through firewall 310. Proxy servers 312 may also access configuration items 410. In FIG. 4, configuration items 410 may refer to any or all of client devices 302, server devices 304, routers 306, and virtual machines 308, any applications or services executing thereon, as well as relationships between devices, applications, and services. Thus, the term "configuration items" may be shorthand for any physical or virtual device, or any application or service remotely discoverable or managed by computational instance 322, or relationships between discovered devices, applications, and services. Configuration items may be represented in a configuration management database (CMDB) of computational instance 322.

As noted above, VPN gateway 412 may provide a dedicated VPN to VPN gateway 402A. Such a VPN may be helpful when there is a significant amount of traffic between managed network 300 and computational instance 322, or security policies otherwise suggest or require use of a VPN between these sites. In some embodiments, any device in managed network 300 and/or computational instance 322 that directly communicates via the VPN is assigned a public IP address. Other devices in managed network 300 and/or computational instance 322 may be assigned private IP addresses (e.g., IP addresses selected from the 10.0.0.0-10.255.255.255 or 192.168.0.0-192.168.255.255 ranges, represented in shorthand as subnets 10.0.0.0/8 and 192.168.0.0/16, respectively).

IV. EXAMPLE DEVICE, APPLICATION, AND SERVICE DISCOVERY

In order for remote network management platform 320 to administer the devices, applications, and services of managed network 300, remote network management platform 320 may first determine what devices are present in managed network 300, the configurations and operational statuses of these devices, and the applications and services provided by the devices, as well as the relationships between discovered devices, applications, and services. As noted above, each device, application, service, and relationship may be referred to as a configuration item. The process of defining configuration items within managed network 300 is referred to as discovery, and may be facilitated at least in part by proxy servers 312.

For purposes of the embodiments herein, an "application" may refer to one or more processes, threads, programs, client modules, server modules, or any other software that executes on a device or group of devices. A "service" may refer to a high-level capability provided by multiple applications executing on one or more devices working in conjunction with one another. For example, a high-level web service may involve multiple web application server threads executing on one device and accessing information from a database application that executes on another device.

Figure 5A:
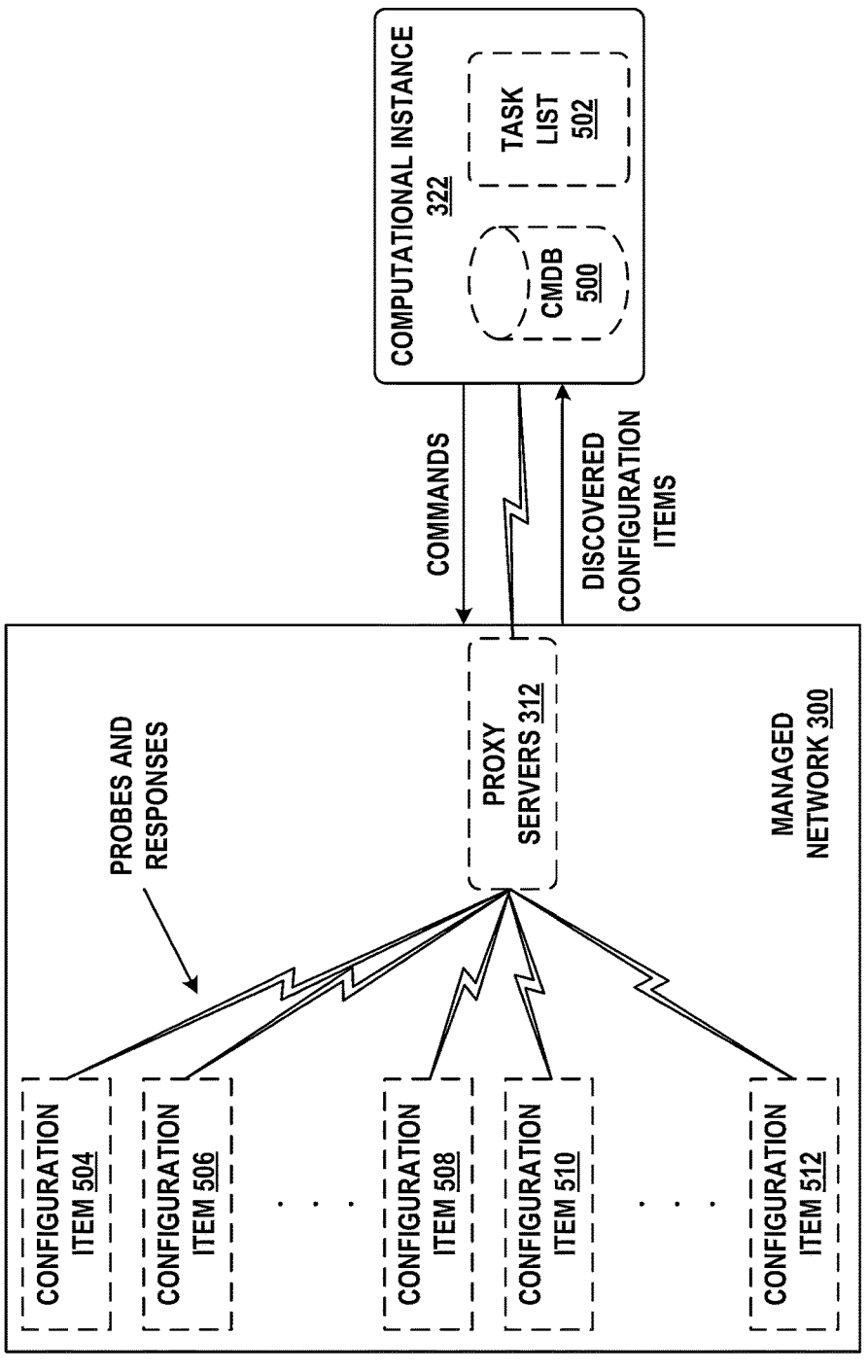
FIG. 5A depicts another communication environment involving a remote network management architecture, in accordance with example embodiments.

FIG. 5A provides a logical depiction of how configuration items can be discovered, as well as how information related to discovered configuration items can be stored. For sake of simplicity, remote network management platform 320, public cloud networks 340, and Internet 350 are not shown.

In FIG. 5A, CMDB 500 and task list 502 are stored within computational instance 322. Computational instance 322 may transmit discovery commands to proxy servers 312. In response, proxy servers 312 may transmit probes to various devices, applications, and services in managed network 300. These devices, applications, and services may transmit responses to proxy servers 312, and proxy servers 312 may then provide information regarding discovered configuration items to CMDB 500 for storage therein. Configuration items stored in CMDB 500 represent the environment of managed network 300.

Task list 502 represents a list of activities that proxy servers 312 are to perform on behalf of computational instance 322. As discovery takes place, task list 502 is populated. Proxy servers 312 repeatedly query task list 502, obtain the next task therein, and perform this task until task list 502 is empty or another stopping condition has been reached.

To facilitate discovery, proxy servers 312 may be configured with information regarding one or more subnets in managed network 300 that are reachable by way of proxy servers 312. For instance, proxy servers 312 may be given the IP address range 192.168.0/24 as a subnet. Then, computational instance 322 may store this information in CMDB 500 and place tasks in task list 502 for discovery of devices at each of these addresses.

FIG. 5A also depicts devices, applications, and services in managed network 300 as configuration items 504, 506, 508, 510, and 512. As noted above, these configuration items represent a set of physical and/or virtual devices (e.g., client devices, server devices, routers, or virtual machines), applications executing thereon (e.g., web servers, email servers, databases, or storage arrays), relationships therebetween, as well as services that involve multiple individual configuration items.

Placing the tasks in task list 502 may trigger or otherwise cause proxy servers 312 to begin discovery. Alternatively or additionally, discovery may be manually triggered or automatically triggered based on triggering events (e.g., discovery may automatically begin once per day at a particular time).

In general, discovery may proceed in four logical phases: scanning, classification, identification, and exploration.

Each phase of discovery involves various types of probe messages being transmitted by proxy servers 312 to one or more devices in managed network 300. The responses to these probes may be received and processed by proxy servers 312, and representations thereof may be transmitted to CMDB 500. Thus, each phase can result in more configuration items being discovered and stored in CMDB 500.

In the scanning phase, proxy servers 312 may probe each IP address in the specified range of IP addresses for open Transmission Control Protocol (TCP) and/or User Datagram Protocol (UDP) ports to determine the general type of device. The presence of such open ports at an IP address may indicate that a particular application is operating on the device that is assigned the IP address, which in turn may identify the operating system used by the device. For example, if TCP port 135 is open, then the device is likely executing a WINDOWS® operating system. Similarly, if TCP port 22 is open, then the device is likely executing a UNIX® operating system, such as LINUX®. If UDP port 161 is open, then the device may be able to be further identified through the Simple Network Management Protocol (SNMP). Other possibilities exist. Once the presence of a device at a particular IP address and its open ports have been discovered, these configuration items are saved in CMDB 500.

In the classification phase, proxy servers 312 may further probe each discovered device to determine the version of its operating system. The probes used for a particular device are based on information gathered about the devices during the scanning phase. For example, if a device is found with TCP port 22 open, a set of UNIX®-specific probes may be used. Likewise, if a device is found with TCP port 135 open, a set of WINDOWS®-specific probes may be used. For either case, an appropriate set of tasks may be placed in task list 502 for proxy servers 312 to carry out. These tasks may result in proxy servers 312 logging on, or otherwise accessing information from the particular device. For instance, if TCP port 22 is open, proxy servers 312 may be instructed to initiate a Secure Shell (SSH) connection to the particular device and obtain information about the operating system thereon from particular locations in the file system. Based on this information, the operating system may be determined. As an example, a UNIX® device with TCP port 22 open may be classified as AIX®, HPUX, LINUX®, MACOS®, or SOLARIS®. This classification information may be stored as one or more configuration items in CMDB 500.

In the identification phase, proxy servers 312 may determine specific details about a classified device. The probes used during this phase may be based on information gathered about the particular devices during the classification phase. For example, if a device was classified as LINUX®, a set of LINUX®-specific probes may be used. Likewise, if a device was classified as WINDOWS® 2012, as a set of WINDOWS®-2012-specific probes may be used. As was the case for the classification phase, an appropriate set of tasks may be placed in task list 502 for proxy servers 312 to carry out. These tasks may result in proxy servers 312 reading information from the particular device, such as basic input/output system (BIOS) information, serial numbers, network interface information, media access control address(es) assigned to these network interface(s), IP address(es) used by the particular device and so on. This identification information may be stored as one or more configuration items in CMDB 500.

In the exploration phase, proxy servers 312 may determine further details about the operational state of a classified device. The probes used during this phase may be based on information gathered about the particular devices during the classification phase and/or the identification phase. Again, an appropriate set of tasks may be placed in task list 502 for proxy servers 312 to carry out. These tasks may result in proxy servers 312 reading additional information from the particular device, such as processor information, memory information, lists of running processes (applications), and so on. Once more, the discovered information may be stored as one or more configuration items in CMDB 500.

Running discovery on a network device, such as a router, may utilize SNMP. Instead of or in addition to determining a list of running processes or other application-related information, discovery may determine additional subnets known to the router and the operational state of the router's network interfaces (e.g., active, inactive, queue length, number of packets dropped, etc.). The IP addresses of the additional subnets may be candidates for further discovery procedures. Thus, discovery may progress iteratively or recursively.

Once discovery completes, a snapshot representation of each discovered device, application, and service is available in CMDB 500. For example, after discovery, operating system version, hardware configuration, and network configuration details for client devices, server devices, and routers in managed network 300, as well as applications executing thereon, may be stored. This collected information may be presented to a user in various ways to allow the user to view the hardware composition and operational status of devices, as well as the characteristics of services that span multiple devices and applications.

Furthermore, CMDB 500 may include entries regarding dependencies and relationships between configuration items. More specifically, an application that is executing on a particular server device, as well as the services that rely on this application, may be represented as such in CMDB 500. For example, suppose that a database application is executing on a server device, and that this database application is used by a new employee onboarding service as well as a payroll service. Thus, if the server device is taken out of operation for maintenance, it is clear that the employee onboarding service and payroll service will be impacted. Likewise, the dependencies and relationships between configuration items may be able to represent the services impacted when a particular router fails.

In general, dependencies and relationships between configuration items may be displayed on a web-based interface and represented in a hierarchical fashion. Thus, adding, changing, or removing such dependencies and relationships may be accomplished by way of this interface.

Furthermore, users from managed network 300 may develop workflows that allow certain coordinated activities to take place across multiple discovered devices. For instance, an IT workflow might allow the user to change the common administrator password to all discovered LINUX® devices in a single operation.

In order for discovery to take place in the manner described above, proxy servers 312, CMDB 500, and/or one or more credential stores may be configured with credentials for one or more of the devices to be discovered. Credentials may include any type of information needed in order to access the devices. These may include userid/password pairs, certificates, and so on. In some embodiments, these credentials may be stored in encrypted fields of CMDB 500. Proxy servers 312 may contain the decryption key for the credentials so that proxy servers 312 can use these credentials to log on to or otherwise access devices being discovered.

The discovery process is depicted as a flow chart in FIG. 5B. At block 520, the task list in the computational instance is populated, for instance, with a range of IP addresses. At block 522, the scanning phase takes place. Thus, the proxy servers probe the IP addresses for devices using these IP addresses, and attempt to determine the operating systems that are executing on these devices. At block 524, the classification phase takes place. The proxy servers attempt to determine the operating system version of the discovered devices. At block 526, the identification phase takes place. The proxy servers attempt to determine the hardware and/or software configuration of the discovered devices. At block 528, the exploration phase takes place. The proxy servers attempt to determine the operational state and applications executing on the discovered devices. At block 530, further editing of the configuration items representing the discovered devices and applications may take place. This editing may be automated and/or manual in nature.

The blocks represented in FIG. 5B are examples. Discovery may be a highly configurable procedure that can have more or fewer phases, and the operations of each phase may vary. In some cases, one or more phases may be customized, or may otherwise deviate from the exemplary descriptions above.

In this manner, a remote network management platform may discover and inventory the hardware, software, and services deployed on and provided by the managed network. As noted above, this data may be stored in a CMDB of the associated computational instance as configuration items. For example, individual hardware components (e.g., computing devices, virtual servers, databases, routers, etc.) may be represented as hardware configuration items, while the applications installed and/or executing thereon may be represented as software configuration items.

The relationship between a software configuration item installed or executing on a hardware configuration item may take various forms, such as "is hosted on", "runs on", or "depends on". Thus, a database application installed on a server device may have the relationship "is hosted on" with the server device to indicate that the database application is hosted on the server device. In some embodiments, the server device may have a reciprocal relationship of "used by" with the database application to indicate that the server device is used by the database application. These relationships may be automatically found using the discovery procedures described above, though it is possible to manually set relationships as well.

The relationship between a service and one or more software configuration items may also take various forms. As an example, a web service may include a web server software configuration item and a database application software configuration item, each installed on different hardware configuration items. The web service may have a "depends on" relationship with both of these software configuration items, while the software configuration items have a "used by" reciprocal relationship with the web service. Services might not be able to be fully determined by discovery procedures, and instead may rely on service mapping (e.g., probing configuration files and/or carrying out network traffic analysis to determine service level relationships between configuration items) and possibly some extent of manual configuration.

Regardless of how relationship information is obtained, it can be valuable for the operation of a managed network. Notably, IT personnel can quickly determine where certain software applications are deployed, and what configuration items make up a service. This allows for rapid pinpointing of root causes of service outages or degradation. For example, if two different services are suffering from slow response times, the CMDB can be queried (perhaps among other activities) to determine that the root cause is a database application that is used by both services having high processor utilization. Thus, IT personnel can address the database application rather than waste time considering the health and performance of other configuration items that make up the services.

V. IMPROVED MODEL TRAINING TECHNIQUES

Transformers and other modern machine learning model structures often include millions, billions, or more trainable parameters, straining the ability of available hardware to train such models. Training methods described herein reduce the computational costs and requirements to train such models (e.g., compute cycle costs, memory costs, inter-node communications costs, required number of GPUs or other processor systems) by improving the distribution of the model training process across multiple computational nodes (e.g., single GPUs or other processors, functionally discrete computational units that may include multiple GPUs, etc.), thereby reducing the idle time exhibited by GPUs or other computational systems applied to perform the method(s). These methods include "layered gradient accumulation" and "modular pipeline parallelism," which together can reduce training time by half, in part by reducing idle time. The methods described herein also reduce the amount of data transmission between compute nodes, reducing network requirements to a point where, for certain models, lower-cost Ethernet links can be used instead of more expensive, faster technologies like InfiniBand. The methods described herein can also reduce memory usage.

Large scale language models, like transformers, have become a preferred architecture for language models, being simpler, more scalable and more performant than alternatives based on recurrent neural networks or other alternatives. Current research suggests that the model performance of transformers is, in many cases, largely driven by the scale of the model.

However, training such large models can be costly a technically challenging. For example, simply storing the training state of GPT-3 takes about 2 terabytes of memory, and storing its intermediate activations and gradients takes several more terabytes. This is dozens of times more memory than available on many GPUs, e.g., the 80 GB NVIDIA A100. Besides memory, training also requires large amount of computing power. The GPT-3 model requires approximately 3600 petaflop-days to train.

To speed up training of large models, the training process can be parallelized by distributing the load across multiple GPUs (or other varieties of computational node). A common method is 3D parallelism, which employs three forms of parallelism: data, pipeline and tensor parallelism. Together with methods such as mixed precision training and activation checkpointing, 3D parallelism facilitates quickly training reasonably large models with up hundreds of billions of parameters, but can slow beyond that scale. For example, GPT-3 has been trained in a matter of days, while the trillion parameter version of the Megatron-LM model would require more than three months to train under similar constraints.

The embodiments described herein implement a variety of parallel training configurations and strategies for large and dense transformers or other large, multi-layered machine learning model types, with the goal of reducing training time when using existing commercially-available hardware. These methods leverage empirically-observed scaling laws related to the "critical batch size" for training a given machine learning model. The critical batch size provides an upper bound on efficient scaling of the batch size, and by extension predicts how many GPUs can be used efficiently for training. As shown below, these methods are not memory-limited even past the trillion parameter model scale.

The methods described herein leverage a number of techniques to improve training efficiency while also reducing memory usage and network requirements. These techniques include "layered gradient accumulation," which employs a bandwidth-efficient scheduling for gradient accumulation. This makes it easier to overlap the gradient reduction with gradient computation and greatly reduces the bandwidth requirement when partitioning (or "sharding") the training state into multiple parallel shards and/or when offloading the training state to CPU memory. The techniques employed herein also include "modular pipeline parallelism," which employs a modular split of the layers of the model being trained to improve the efficiency of pipeline-parallel training. This organization of the training task has the effect of reducing the training pipeline "bubble" while also being compatible with layered gradient accumulation in the context of pipeline parallelism. These methods together allow training at least twice as fast as previous methods.

The methods described herein also make it possible to more efficiently shard and/or offload the training state within the context of 3D pipeline parallelism. Such sharding can make it easier to reduce the "bubble" of modular pipeline parallelism. Such offloading can be considered as a manner of saving more frequent checkpoints.

While this description focuses on large transformers, the methods described herein (e.g., "layered gradient accumulation," "modular pipeline parallelism," and/or other techniques described herein) can be applied to other layered machine learning model structures, including relatively small models. The improved communication overlap provided by the methods described herein can be useful for training smaller models, particular over slower networks.

A. Critical Batch Size

In stochastic gradient descent, the gradient of the loss with respect to the model parameters is estimated from a micro-batch of the training data. Such a micro-batch can be as small as a single sample of training data, or multiple samples, all of which are processed by the same computational node or set of computational nodes (e.g., a 'slice' of computational nodes through an array of nodes arranged according to 3D parallelism (or 2D parallelism, or N-D parallelism) where one of the 'dimensions' of the parallelism is data parallelism). Increasing the number of samples in each micro-batch improves the gradient estimate and can allow a model to be trained with a proportionally lower number of steps, keeping the overall amount of computation relatively unchanged. However, past a certain number of samples per micro-batch, the gradient estimate becomes accurate enough and adding more samples no longer reduces the number of training steps. This "critical batch size" provides an upper limit for the small micro-batch regime, and can obtained by estimating the variation (noise) of the gradients between individual samples, relative to the true gradients.

B. Distributed Training

There are two main forms of parallelism, data parallelism in which each device (e.g., computational node) performs the same computation on a subset of the data, and model parallelism in which the model and computation are split between devices. In data parallelism, a batch of training samples is split between the devices, each independently processing a single micro-batch, and then sharing the resulting gradients with each other to generate an overall gradient. Data parallelism is commonly used for parallel training, because of its simplicity and wide availability. However, data parallelism alone requires each device to store a copy of the model, resulting in significant memory usage for larger models. Adding more data-parallel instances can also increase the batch size, which cannot effectively grow beyond the critical batch size. Each instance needs to process at least one sample, and in practice each instance processes multiple samples in order to avoid a network bottleneck. This can limit data parallelism to a fraction of the critical batch size, which does not scale much with the model size. As a result, data parallelism alone is insufficient to provide enough computing power to train larger models.

Model parallelism comes in two main forms, depending on how the model is split. In the first form, "pipeline parallelism," each device is responsible for a subset of the layers of the model being trained and the input is processed sequentially. For the computation of the different layers to be performed in parallel, the input can consist of several micro-batches that are pipelined through the network. However, this method is also limited by the critical batch size, as explained above in connection with data parallelism. This "pipelining" can method also suffer from a "bubbling" effect where the devices are input-starved for a part of the computation. The bubbling effect can be mitigated by adding even more micro-batches, which can come at the expense of data parallelism. Nevertheless, pipelines model parallelism can be efficiently combined with data parallelism to reduce network requirements and memory usage, improving over either method taken in isolation.

Another form of model parallelism is "tensor parallelism," wherein the computation of individual tensors during training is also split amongst devices as one of the dimensions of parallelism. "Tensor parallelism" is often referred to as "model parallelism" in the literature. However, "model parallelism" is also used to refer to pipeline parallelism. In this disclosure, the more general term "model parallelism" is used to refer to a genus that includes both methods (tensor parallelism and pipeline parallelism). Note that this usage is, itself, not the most generic possible definition, since tensor slicing is, according to some formulations, more generic than the "slice along the channel direction" meaning used here. For example, data parallelism could be considered is a trivial form of tensor slicing along the "batch dimension" that is relatively unrelated to model parallelism as described herein.

The layered gradient accumulation, modular pipeline parallelism, and other methods described herein improve issues related to memory use, training time, and inter-device communications that are experienced by alternative methods that shard training state data across multiple devices, offload much of the training data to CPU memory, and split large computations into smaller blocks (e.g., the ZeRO family of methods).

C. Computation Optimizations

Training deep learning models does not require a high precision, and the leading approach uses mixed precision training, in which the bulk of the computation is done in half-precision (16 bits) and the weights are stored and updated in single-precision (32 bits). Half-precision however has a limited exponent range, and the gradients can be dynamically scaled to limit the risk of underows and overows. The problem can also be addressed by using the bfloat16 data format, which has a wider exponent range and is available in recent devices such as the NVIDIA A100.

In addition to the computation itself, data transfers present a significant optimization challenge. They should preferably be done in parallel with the bulk of the computation, otherwise the computational cores may idle during the transfer. As the computation and network communications mostly use separate resources, they can in principle be overlapped with near-perfect efficiency, so the runtime is determined by the slowest of the operations. The operation is said to be compute-bound or data-bound depending on which one finishes last, with the former scenario being generally preferable. In practice, there is a small overhead to overlapping the operations.

The threshold for a compute-bound operation is described through the concept of arithmetic intensity. For an operation which requires both computation and data transfer, the arithmetic intensity is defined as the ratio between the amount of computation and data transfer. In the case of perfect overlap, the operation is compute-bound as long as the arithmetic intensity is higher than what the hardware can support. For example, an NVIDIA A100 has a peak computational power of 312 teraflops for half-precision and a memory bandwidth of 2039 GB/s, for an arithmetic intensity threshold of 143 ops/B. A binary addition with an arithmetic intensity of $\frac{1}{6}$ lies deeply in the memory-bound region, while the multiplication of two 1024×1024 matrices has an arithmetic intensity of 341 and is compute-bound.

D. Memory Optimizations

As the model grows in size, so does its memory usage. The bulk of the memory usage falls in two categories: the training state and the activation memory. The training state consists of the models parameters and the optimizer state, which for ADAM includes the running average and variance of the parameters. Parameter gradients may also be considered part of the training state. The activation memory consists of the layer activations and gradients. Both categories can use substantial amounts of memory for larger models, but various techniques have been developed to reduce memory consumption.

The training state is proportional to the model size. At 80 GB, an NVIDIA A100 can store at most 20 billion weights in single precision, or 6.7 billions with ADAM. The memory usage can be reduced with model parallelism, which splits the state between the devices. Alternatively, the state can be sharded in the data parallel direction, or even offloaded to CPU memory. Each of these methods allows managing the state memory issue, but model parallelism provides benefits from a computational perspective. The performance of state sharding may be reduced when combined with standard pipeline parallelism, and offloading works better when combined with sharding the state.

With a training state sharding and/or offloading, the model weights are stored in another device and must be restored to the device before usage, so additional buffers are required. Similarly, the gradients need to be created on a buffer before being moved to the appropriate location (e.g., device, or particular memory within a single device). While these parameter and gradient buffers are usually small compared to the entire training state of the model being trained, they can dominate GPU memory usage for larger models once the memory use of other optimization methods are taken into account. These buffers may also be required in the absence of sharding or offloading, as for example where the parameters need to be converted to 16 bits before usage.

Activation memory is also a concern, and naive implementations can easily require hundreds of gigabytes even at the billion parameter scale. Significant reductions in activation memory can be obtained by employing activation checkpointing, in which the bulk of the activations are dropped during the forward pass. In this method, a subset of the activations are kept as checkpoints and are used to recalculate the remaining activations during the backward pass. This lowers the activation memory by a significant factor, reducing it potentially to nothing more than the layer activations, which can in many cases be offloaded to CPU memory. The method can come at the cost of an increase in computation (e.g., by 33%), but for larger models the available hardware may require the use of such methods.

As the activation memory is proportional to the micro-batch size, an obvious memory optimization is to lower it, down to a single sample if possible. While single-sample micro-batches are typically not recommended, they can run efficiently for larger models for which the computation kernels are big enough. However, small micro-batches come with a lower arithmetic intensity with respect to the model weights, potentially creating a bottleneck in the case of data parallelism or memory offload. The layered gradient accumulation and modular pipeline parallelism methods described herein are designed to reduce or prevent such bottlenecks, and to allow running efficiently with a micro-batch sample size of one.

Gradient accumulation can also allow the batch size to be increased without running out of memory, by allowing multiple micro-batches to be processed sequentially between weight updates. This is especially useful with data parallelism over a slow network, as larger batches reduce the frequency of the gradient reduction. However, this can lead to inefficient overlap between the computation and the communication of the results of the computation as the gradient reduction is concentrated in the last micro-batch. This method can also be counter-productive with respect to optimizing the training time, since the micro-batches are processed sequentially instead of in parallel. The layered gradient accumulation methods described herein are designed to improve this communication overlap, while pipeline parallelism allows processing the micro-batches in parallel.

VI. EXAMPLE METHODS

To explain the methods described herein by way of example, we refer to a transformer encoder as the machine learning model to be trained. However, as noted above, the methods described herein can be applied to any machine learning model whose structure is divided into layers from input to output and/or whose structure can be divided up into such layers. Transformer encoders are for example used in the BERT model and its derivatives, and so the results provided herein can be straightforwardly generalized to decoder-based models such as the GPT family. Other possibilities include models having both encoders and decoders, like the T5 family of models.

A transformer encoder consists of $d_l$ identical layers, each composed of a multi-head attention module followed by a non-linearity. The former consists of $d_a$ attention heads of size $d_h$, for a layer width $d_m = d_a * d_h$, while the latter consists of a two-layer dense feedforward network with intermediate size $d_f = n_f * d_m$. Each layer holds $p_l \approx (4+2n_f)d^2_m$ parameters, for a total of $p \approx (4+2n_f)d^2_m * d_l$ parameters.

A. 3D Parallelism

By way of example, we depict a method of model training that exhibits three dimensional parallelism version, with data parallelism of degree $n_b$, pipeline parallelism of degree $n_l$, and tensor parallelism of degree $n_a$, for a total of $n_{gpu}=n_b n_l n_a$ devices. An input batch of size b is split both between the data-parallel instances, and between $n_\mu > n_l$ sequential micro-batches, for a resulting micro-batch size $b_\mu = b/(n_b * n_\mu)$. For a critical batch size $b_c$, this results in the bound $n_b * n_\mu < b_c$, or $n_b * n_l < b_c$.

The forward and backward passes were performed separately on each instance, then the gradients were all-reduced across instances and the weights were updated redundantly on each instance. The gradient reduction was overlapped as much as possible with the backward pass, and consisted of equally long scatter-reduce and all-gather operations.

In the sharded case, the training state was sharded across all the data parallel instances, each being responsible for updating its share of the weights. The sharding was designed so that the gradient reduction could be performed with a scatter-reduce, which is twice as fast as an all-reduce. The weights were restored with an all-gather both in the forward and backward passes, for a 50% increase in communication, although in this case the network load is slightly more balanced.

FIG. 6 depicts an example schedule of computation and network use with data parallelism for non-layered (or "standard") gradient accumulation (top) and layered gradient accumulation (bottom). The letters represent the different layers (or contiguous sets of layers) of the model being trained, with the capitalization representing the forward (lowercase) and backward (uppercase) passes. The numerals indicate the index of the micro-batch being computed. The layered version reduces the network requirement by spreading the gradient reduction over most of the backward pass. The extent of the operations in the "network" portion of the figure depicts the time available for a maximally-overlapped data transfer, not necessarily the actual time taken to complete the data transfer.

In the "Non-Layered Gradient Accumulation" pipeline parallelism depicted in FIG. 6, layers of the model were split into contiguous chunks. The micro-batches were then streamed through the pipeline in the forward pass, then streamed in the reverse order during the backward pass. The latency for the first and last input to reach the last instance decreased the efficiency by a factor $(n_l-1)/n_\mu$. For a maximally parallel case, with $n_\mu = n_l$, the GPUs are idle nearly half the time and the training time is doubled.

In the "Layered Gradient Accumulation," the input batch was split into micro-batches the same as for the non-layered gradient accumulation, but all of the micro-batches are processed (forward or backward) for a given layer before proceeding to the next layer. To save on memory use, such layers can be selected as the intervals between activation checkpoints, so that the intermediate activations between the micro-batches can be discarded.

The layered gradient accumulation method is advantageous from a data perspective. With data parallelism, it allows an efficient overlap of the gradient reduction with the backward pass, unlike traditional gradient accumulation which only allows overlapping with the final micro-batch. This is illustrated in FIG. 6. With state sharding, layered gradient accumulation can greatly reduce the bandwidth requirement by eliminating redundancies in the parameter restoration and gradient reduction operations, as illustrated in FIG. 7. Layered gradient accumulation can also help with offloading by reducing the amount of data movement. All the activation checkpoints must be kept, which in the presence of pipeline parallelism is already advantageous, but otherwise may cause an increase in the activation checkpoint memory.

FIG. 7 depicts an example schedule of computation and network use with state sharding and/or offload, for non-layered gradient accumulation (top) and layered gradient accumulation (bottom). The letters in the "compute" schedule represent the different layers (or contiguous sets of layers) of the model being trained, with the capitalization representing the forward (lowercase) and backward (uppercase) passes. The letters in the "network" schedule represent communications related to the different layers (or contiguous sets of layers) of the model being trained, with the lowercase letters representing restoration of the layer weights and the uppercase letters representing communications to reduce the determined gradients for a given layer across instances.

The non-layered method involves frequent context switches with respect to the weights, leading to increased bandwidth requirements. The layered version on the other hand maximizes the reuse of the restored weights, requiring a similar bandwidth as without gradient accumulation.

Note that layered gradient accumulation generally cannot be efficiently combined with non-modular pipeline parallelism. Indeed, a given instance of a non-modular pipeline-parallel training array must process all of its batch for all every layer other than the final layer before it can pass an output to the next instance. This limitation is addressed by the modular pipeline parallelism techniques described herein.

B. Modular Pipeline Parallelism

In pipeline parallelism, the layers are generally split into contiguous chunks, i.e. the first instance (or "computational node") gets layers 1 to $d_l/n_l$ of the model being trained (with the layers being numbered from '1'), the second instance gets the layers $d_l/n_l+1$ to $2*d_l/n_l$, etc. However, while this "naive" splitting reduced pipeline-parallel network operations, it also increases the bubbling effect. In modular pipeline parallelism, the layers are instead split in a modular fashion, so that the first instance gets the layers 1, $n_l+1$, $2*n_l+1$, etc., the second gets the layers 2, $n_l+2$, $2*n_l+2$, etc., and so on. The computation is done in the expected way, with a given instance processing all micro-batches for a given layer, then beginning the next assigned layer, the input for which should be ready and received from the instance assigned the immediately preceding layer, etc. To implement such splitting, the stored state information for the model can be sharded, with the sharded state information being offloaded to storage external from a particular node, and potentially eventually restored to that node, as necessary.

In the modular formulation, a micro-batch first reaches the final computational instance after being processed on $n_l-1$ layers rather than on $d_l*(1-1/n_l)$ layers, reducing the bubbling overhead by a factor of $d_l/n_l$. This makes it possible to reduce the bubbling almost to zero without increasing the number of micro-batches $n_\mu$. Additionally, the gradient reduction is spread more evenly over the backward pass, dividing the network overhead by a factor of $d_l/n_l$.

Modular pipeline parallelism can result in an increased pipeline parallel network cost since data (model data as well as, potentially, sharded state information) is transferred between instances after the computation of each layer (rather than after each set of contiguous layers, as in non-modular pipelining). However, for large models this cost remains far below the data parallel network usage. The modular pipeline parallelism method combines well with layered gradient accumulation, since both methods process one layer (or small set of contiguous layers) at a time.

Figure 8:
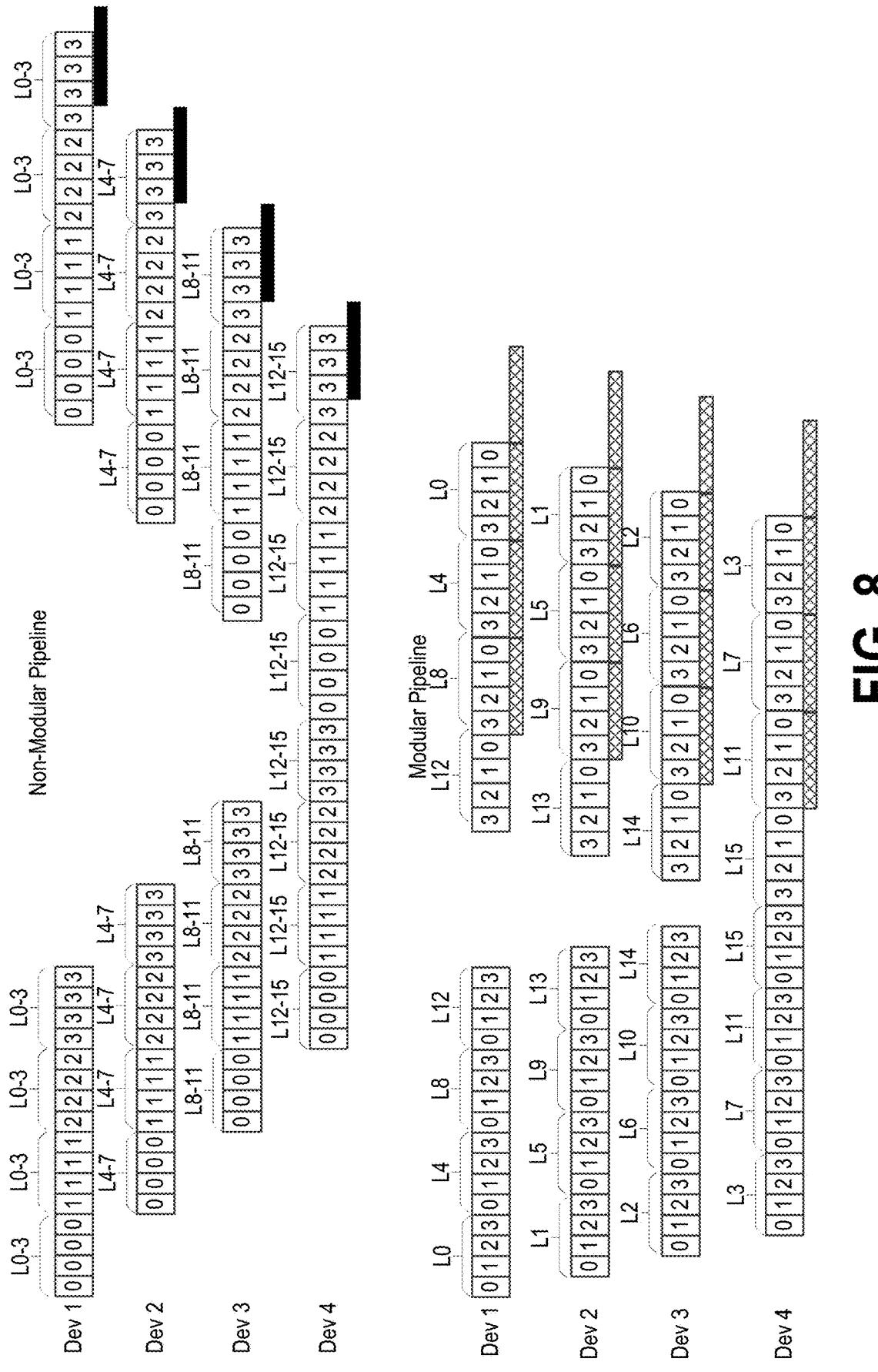
FIG. 8 depicts an example schedule of computation and communication during training of a model, in accordance with example embodiments.

FIG. 8 depicts an example schedule of computation and network use for non-modular pipeline parallelism (top) and modular pipeline parallelism (bottom). Each row depicts the scheduling of computation by model layer (numbered starting with 0, so the sixteen layers of the example model are numbered 0-15) and micro-batch number (from 0-3). The micro-batch numbers are depicted within the corresponding 'box' of the schedule, while the layer is indicated above the boxes by "L" number. So, in the upper-leftmost portion of the top half of FIG. 8, a first instance ("Dev 1") is computing layers 0-3 ("L0-3") for micro-batch 0, then layers 0-3 for micro-batch 1, etc. In the upper-leftmost portion of the bottom half of FIG. 8, a first instance ("Dev 1") is computing layer 0 ("L0") for micro-batches 0-3, then layer 4 ("L4") for micro-batches 0-3, etc. The left half of the boxes in FIG. 8 represent the forward pass, generating activations for the layers and micro-batches, while the right half of the boxes represent the backward pass, generating gradient and error information for the layers and micro-batches. The cross-hatched bars represent communications to reduce the determined gradients for a given layer across instances.

FIG. 9 is a flow chart illustrating an example embodiment. The process illustrated by FIG. 9 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 9 may be simplified by the removal of any one or more of the features shown therein. Further, these embodiments may be combined with features, aspects, and/or implementations of any of the previous figures or otherwise described herein.

The example embodiment of FIG. 9 includes assigning layers of a machine learning model to a plurality of compute nodes, wherein each of the layers is assigned to exactly one of the compute nodes, wherein the layers have a sequential ordering (910). The example embodiment of FIG. 9 additionally includes dividing training data for the machine learning model into a plurality of micro-batches (912). The example embodiment of FIG. 9 also includes performing a forward-propagation of the micro-batches through the machine learning model, wherein each of the compute nodes operates in parallel to generate respective activation states for the micro-batches with each of its assigned layers, and wherein the respective activation states are communicated between the compute nodes in accordance with the sequential ordering of the layers (914). The example embodiment of FIG. 9 yet further includes performing a backward-propagation of the micro-batches through the machine learning model, wherein each of the compute nodes operates in parallel to generate respective error states for the micro-batches with each of its assigned layers, wherein the respective error states are communicated between the compute nodes in accordance with a reversal of the sequential ordering of the layers, and wherein each of the compute nodes completes the backward-propagation of all of the micro-batches through a given layer prior to performing backward-propagation through any layer that precedes the given layer in the sequential ordering (916). The example embodiment of FIG. 9 could include additional or alternative steps or elements.

FIG. 10 is a flow chart illustrating an example embodiment. The process illustrated by FIG. 10 may be carried out by a computing device, such as computing device 100, and/or a cluster of computing devices, such as server cluster 200. However, the process can be carried out by other types of devices or device subsystems. For example, the process could be carried out by a portable computer, such as a laptop or a tablet device.

The embodiments of FIG. 10 may be simplified by the removal of any one or more of the features shown therein. Further, these embodiments may be combined with features, aspects, and/or implementations of any of the previous figures or otherwise described herein.

The example embodiment of FIG. 10 includes operating M compute nodes to train a machine learning model based on a batch of N training examples, wherein the batch of N training examples is divided into n micro-batches, wherein the machine learning model comprises L layers, each layer defined by a respective plurality of parameters of the machine learning model (1010). Operating the M compute nodes to train the machine learning model based on the batch of N training examples includes updating the parameters of the machine learning model by: (i) sequentially applying, by a first compute node of the M compute nodes, each of the micro-batches to a first layer of the L layers to generate respective first-layer activation states; (ii) transmitting, from the first compute node to a second compute node of the M compute nodes, the first-layer activation states; (iii) sequentially applying, by the second compute node, each of the first-layer activation states to a second layer of the L layers to generate respective second-layer activation states for each of the micro-batches, wherein the second compute node applying a particular one of the first layer activation states to the second layer at least partially overlaps in time with the first compute node transmitting a subsequent one of the first layer activation states to the second compute node; (iv) transmitting, from an $M^{th}$ compute node of the M compute nodes to the first compute node, $M^{th}$-layer activation states for each of the micro-batches; (v) sequentially applying, by the first compute node subsequent to generating the first-layer activation states, each of the $M^{th}$-layer activation states to an $(M+1)^{th}$ layer of the L layers to generate respective $(M+1)^{th}$-layer activation states for each of the micro-batches; (vi) transmitting, from an $(M-1)^{th}$ compute node of the M compute nodes to the $M^{th}$ compute node, $(L-1)^{th}$-layer activation states for each of the micro-batches; (vii) sequentially applying, by the $M^{th}$ compute node, each of the $(L-1)^{th}$-layer activation states to an $L^{th}$ layer of the L layers to generate respective $L^{th}$-layer activation states for each of the micro-batches; (viii) based on the $L^{th}$-layer activation states, generating respective $L^{th}$-layer error states for each of the micro-batches; (ix) sequentially applying, by the $M^{th}$ compute node, each of the $L^{th}$-layer error states to the $L^{th}$ layer to generate respective $(L-1)^{th}$-layer error states for each of the micro-batches and respective $L^{th}$-layer parameter update information for each of the micro-batches; (x) transmitting, from the $M^{th}$ compute node to the $(M-1)^{th}$ compute node, the $(L-1)^{th}$-layer error states; (xi) sequentially applying, by the $(M-1)^{th}$ compute node, each of the $(L-1)^{th}$-layer error states to the $(L-1)^{th}$-layer to generate respective $(L-2)^{th}$-layer error states for each of the micro-batches and respective $(L-1)^{th}$-layer parameter update information for each of the micro-batches, wherein the $(M-1)^{th}$ compute node applying a particular one of the $(L-1)^{th}$-layer error states to the $(L-1)^{th}$-layer at least partially overlaps in time with the $M^{th}$ compute node transmitting a subsequent one of the $(L-1)^{th}$-layer error states to the $(M-1)^{th}$ compute node; (xii) transmitting, from the first compute node to the $M^{th}$ compute node, $(L-M)^{th}$-layer error states for each of the micro-batches; and (xiii) sequentially applying, by the $M^{th}$ compute node subsequent to generating the $(L-1)^{th}$-layer error states to an $(L-M)^{th}$-layer error states, each of the $(L-M)^{th}$ layer of the layers to generate respective $(L-M-1)^{th}$-layer activation states for each of the micro-batches and respective $(L-M-1)^{th}$-layer parameter update information for each of the micro-batches. The example embodiment of FIG. 10 could include additional or alternative steps or elements.

VII. ANALYSIS

The analyses/experiments below were, absent indications to the contrary, performed using a scalable cluster with up to 16 A100 GPUs per node, supporting both InfiniBand and NVLinks.

A. Trillion Parameter Example

To investigate the requirements for training at the trillion parameter scale, we applied the 1.26 trillion parameter model $X_{160}$. This model consists of 160 transformer layers with 80 heads of size 320, for a width of 25600. The sequence length was 2560, and the critical batch size was estimated to be around 2420. Training for 100 k steps requires 6:24*1024 floating point operations, or 72 exaflop/s*day, which corresponds to 231k GPU-days on A100s at perfect efficiency.

Although the computational requirement implies that a large cluster is necessary for such training tasks, for purvalue $d_l$, so that the data parallelism overhead and memory usage were reduced. The micro-batch size was constrained by the offloading bottleneck, and the micro-batch count $n_\mu$ was at least 4% higher than $n_l$ to overlap the pipeline-parallel communication. We then increased $n_b$ to the highest value allowed by the critical batch size. At this level, the bubbling effect reduced the efficiency by half, although a higher efficiency could be achieved at the expense of parallelism and training speed. We do not consider state sharding in this case because it was worse than with data parallelism alone.

With modular pipeline parallelism ("improved" below), $n_l$ is reduced as low as allowed by the network to reduce the bubbling effect, and $n_b$ was increased correspondingly. We assumed a sharded training state, so that the focus on data parallelism did not lead to an excessive memory usage from the state. The micro-batch size was no longer constrained by the state offload, which in any cases was not even needed.

When tensor parallelism was also present, it multiplied the number of GPUs by up to 16, and in some cases removed the need for offloading and reduced the associated micro-batch size constraint.

The resulting configurations are summarized in Table 1, together with the expected computational efficiency and approximate predicted training time. We found both data and tensor parallelism to be necessary (and together sufficient) to train in a reasonable amount of time. Modular pipeline parallelism stood out with both a high GPU count and near-optimal efficiency, allowing the model to be trained in a week. It also out-performed the baseline in the absence of tensor parallelism, but in that case the training time remained above three months.

TABLE 1

| Fastest training configuration for $X_{160}$ for selected training methods | | | | | | | | | | | |
|---|---|---|---|---|---|---|---|---|---|---|---|
| Parallelism | Method | Offloading | b | $b_\mu$ | $n_\mu$ | $n_{gpu}$ | $n_b$ | $n_l$ | $n_\alpha$ | Efficiency | Time |
| None | Baseline | Yes | 2416 | 4 | 604 | 1 | 1 | 1 | 1 | 1.00 | 630 y |
| Data | Baseline | Yes | 2415 | 5 | 1 | 483 | 483 | 1 | 1 | 1.00 | 1.3 y |
| Data | Sharded | Yes | 2415 | 5 | 1 | 483 | 483 | 1 | 1 | 1.00 | 1.3 y |
| Data + pipe | Baseline | Yes | 2412 | 4 | 201 | 480 | 3 | 160 | 1 | 0.56 | 2.4 y |
| Data + pipe | Improved | No | 2415 | 1 | 5 | 2415 | 483 | 5 | 1 | 0.94 | 100 d |
| Data + tensor | Baseline | Yes | 2415 | 5 | 1 | 7728 | 483 | 1 | 16 | 0.93 | 32 d |
| Data + tensor | Sharded | No | 2415 | 5 | 1 | 7728 | 483 | 1 | 16 | 0.93 | 32 d |
| 3D | Baseline | No | 2408 | 1 | 172 | 35840 | 14 | 160 | 16 | 0.48 | 13 d |
| 3D | Improved | No | 2415 | 1 | 5 | 35840 | 483 | 5 | 16 | 0.88 | 6.8 d | poses of comparison we applied various parallelism scenarios, with the training configuration selected as follow:

In the single GPU case, we trained at the critical batch size, and used standard gradient accumulation to reduce the activation memory. The micro-batch size was set as small as allowed by the offloading bottleneck.

With data parallelism only, we also reduced the micro-batch size, this time to increase $n_b$. The micro-batch size was constrained by the data-parallel network transfer and in the non-sharded case was further limited by the state offloading, with the bottleneck being the PCI-express connection in the backward pass.

With traditional, non-modular pipeline parallelism ("baseline" below), $n_l$ was taken to the highest possible The efficiency values are slightly overestimated as they ignore inefficiencies in the computation kernels and network transfers, as well as in their overlap. Consequently, the real training times would be moderately higher than the approximate predicted times depicted in Table 1.

A breakdown of the memory usage for each configuration is shown in Table 2. All tensor parallel methods were found to be viable, but the simplest version required an impractical amount of offloaded memory. Modular pipeline parallelism has the lowest memory footprint of 5.2 GB, which is 15 times less than the memory available in a 80 GB A100, and easily fits in older devices. 1D and 0D parallelism, on the other hand, required too much non-offloadable memory, but this can be addressed with layered gradient accumulation.

TABLE 2

| | | | | | | | Non- |
|---|---|---|---|---|---|---|---|
| Parallelism | Method | State | Checkpoint | Buffers | Activations | Offloadable | Offloadable |
| None | Baseline | 14.1k | 47.2k | 43.9 | 24.9 | 61.2k | 68.8 |
| Data | Baseline | 14.1k | 97.7 | 43.9 | 31.1 | 14.2k | 75.1 |
| Data | Sharded | 29.1 | 97.7 | 43.9 | 31.1 | 127 | 75.1 |
| Data + pipe | Baseline | 87.9 | 98.1 | 43.9 | 24.9 | 186 | 68.8 |
| Data + pipe | Improved | 5.82 | 19.5 | 43.9 | 6.23 | 25.4 | 50.2 |
| Data + tensor | Baseline | 879 | 6.10 | 2.75 | 1.95 | 885 | 4.69 |
| Data + tensor | Sharded | 1.82 | 6.10 | 2.75 | 1.95 | 7.92 | 4.69 |
| 3D | Baseline | 5.49 | 1.31 | 2.75 | 0.389 | 6.81 | 3.14 |
| 3D | Improved | 0.364 | 1.22 | 2.75 | 0.389 | 1.58 | 3.14 |

Memory usage breakdown for the training configurations described in Table 2.

Although training scales to nearly 40000 GPUs, it may be difficult to find and/or create a cluster of that size. Accordingly, in some applications is may be beneficial to train a model using fewer GPUs over a longer period of time. There are a variety of viable strategies for smaller clusters, allowing trade-offs between efficiency, memory usage, and the choice of parallelism methods. In Table 3 we provide some example configurations with high efficiency for the target training times of one and six months. With these time constraints, it is possible to train with clusters of sizes 7400 and 1300 respectively, which makes training available to a wider community. The memory usage is increased when compared with the larger clusters, but remains far below what is commercially available. Among the methods considered, ours is the most efficient, although the margin becomes negligible for longer training times. It is also far more flexible, as shown for example in the last two entries. The six month training is the only one able to train without tensor parallelism (with offload). It is also able to train with a much lower batch size, which amounts to an extra efficiency gain as there is an implicit cost to training with a high batch size.

resulting memory usage and training time as a function of the model size at various scales, with a maximum node size of 16, and a maximum tensor parallelism overhead of 25%. The improved method outperforms the others at most scales, although above the quadrillion parameter scale pipeline parallelism is no longer necessary, and the sharded and improved approaches become similar.

We found, using our improved method, that 80 GB is enough to train models up to 280 trillion parameters, with offloading being required above 30 trillion parameters. However, such a model would take up to four years to train. To obtain better scaling limits, we considered a reasonable threshold for training duration of one month, and a more generous threshold of one year. These thresholds respectively resulted in limits of about 5 and 50 trillion parameters, with maximal non-offloadable memory usages of 9 and 40 GB.

The above results indicate a strong limitation on the model size owing to the acceptable training time. It may however be possible to do better with existing GPUs. While data and pipeline parallelism can be limited by the critical batch size, tensor parallelism is currently limited by a

TABLE 3

Selected training configurations for $X_{160}$ for the specified training times of one and six months.

| Parallelism | Method | b | $n_u$ | $n_{gpu}$ | Offloadable | Non-Offloadable | Efficiency | Time |
|---|---|---|---|---|---|---|---|---|
| Data + tensor | Sharded | 2415 | 16 | 7728 | 7.92 | 4.69 | 0.93 | 32 d |
| 3D | Baseline | 2416 | 16 | 10240 | 10.1 | 3.14 | 0.73 | 31 d |
| 3D | Improved | 2220 | 4 | 7400 | 7.76 | 12.5 | 0.97 | 32 d |
| Data + tensor | Sharded | 1660 | 8 | 1328 | 35.0 | 9.38 | 0.97 | 180 d |
| Pipe + tensor | Baseline | 2416 | 8 | 1280 | 47.9 | 6.27 | 0.91 | 199 d |
| 3D | Improved | 792 | 2 | 1320 | 22.4 | 25.1 | 0.97 | 180 d |
| Data + pipe | Improved | 1572 | 1 | 1310 | 34.2 | 50.2 | 0.98 | 180 d |
| 3D | Improved | 102 | 16 | 1360 | 11.8 | 3.14 | 0.91 | 186 d |

B. Scaling Analysis and Practical Limits

Figure 11:
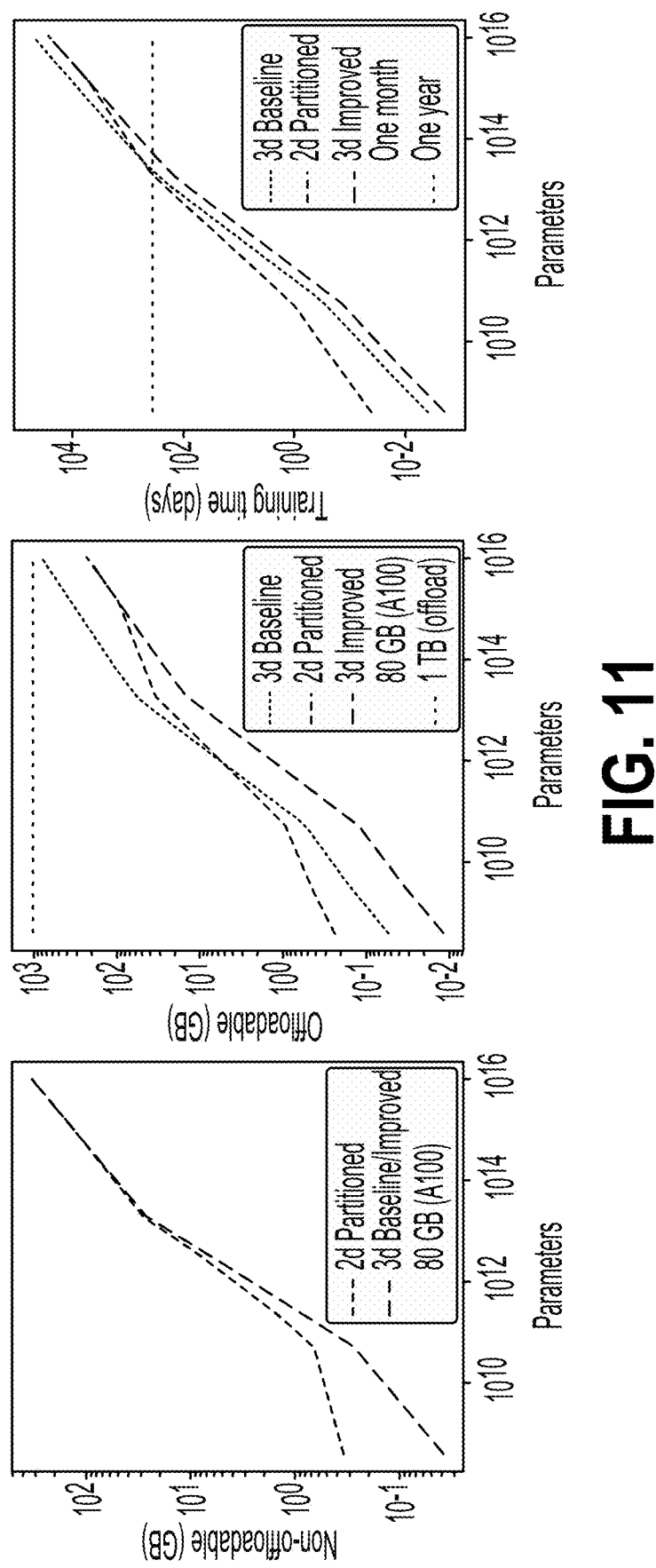
FIG. 11 depicts analytical results, in accordance with example embodiments.
Figure 12:
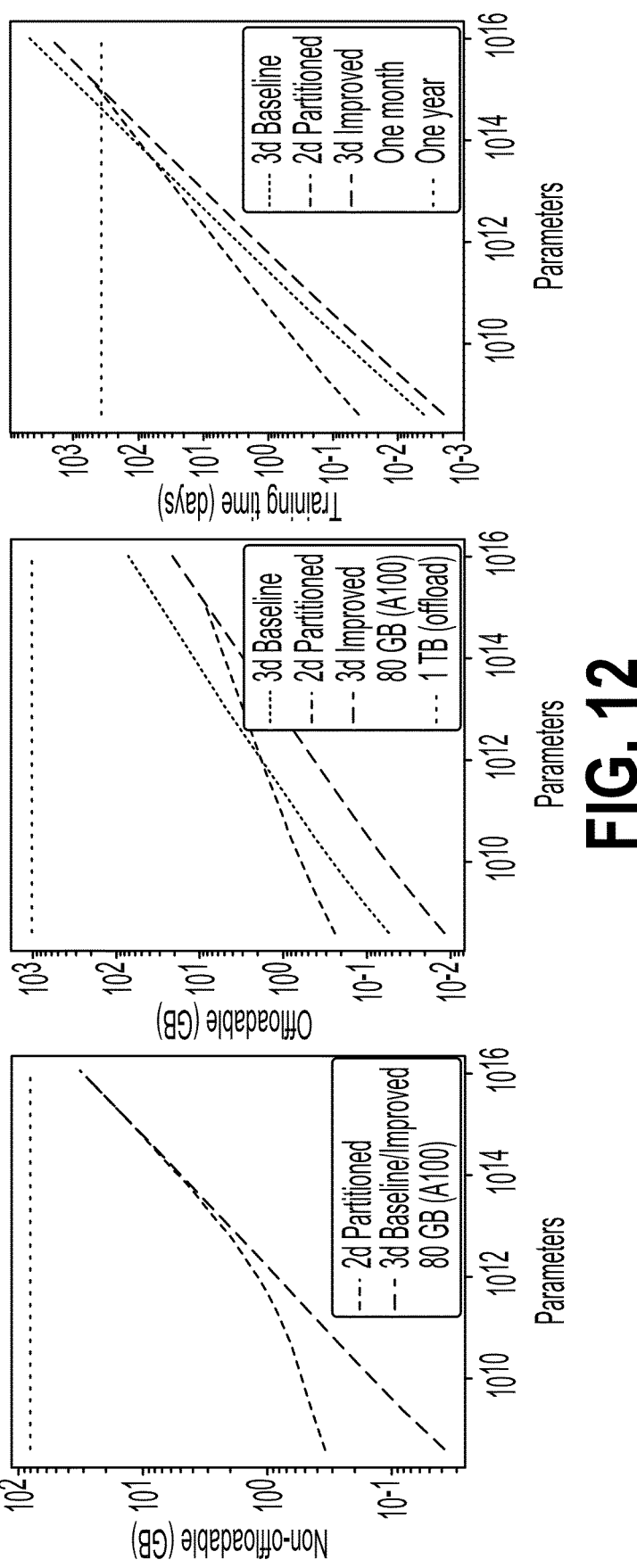
FIG. 12 depicts analytical results, in accordance with example embodiments.

We analyzed how the memory usage and training time scale with the model size, using the $X_{[x]}$ model family. For comparison purposes, we considered three training methods: a baseline 3D parallelism, a baseline sharded method with 2D parallelism, and an improved 3D parallelism using layered gradient accumulation and modular pipeline parallelism. We assumed a practical node size limit of 16, and a maximum tensor parallelism overhead of 25%. With this threshold, the highest tensor parallelism on NVLink with $n_a=16$ was achieved at around 100 billion parameters. We also considered tensor parallelism over InfiniBand, which becomes preferable around 10 trillion parameters and improves scaling beyond that point. FIG. 11 shows the somewhat arbitrary computer hardware design choice which limits the node size to 16. The fully connected NVSwitch topology in DGX and HGX nodes is convenient in the general case, but tensor parallelism only requires a ring topology, which is easy to scale to an arbitrary size. This means larger nodes (or separate nodes connected with NVLink) should be possible. For this reason we consider the scenario where the node size limitation is removed, with the results being shown in FIG. 12. In this case, there was enough memory for models up to 100 quadrillion parameters, while the training time reduced the limit to 40 trillion parameters for training to complete is less than one month, or 900 trillion parameters for training to complete is less than one year. FIG. 12 depicts approximate minimal memory usage and training time for selected training methods, with no limitation on the node size, and a maximum tensor parallelism overhead of 25%.

Figure 13:
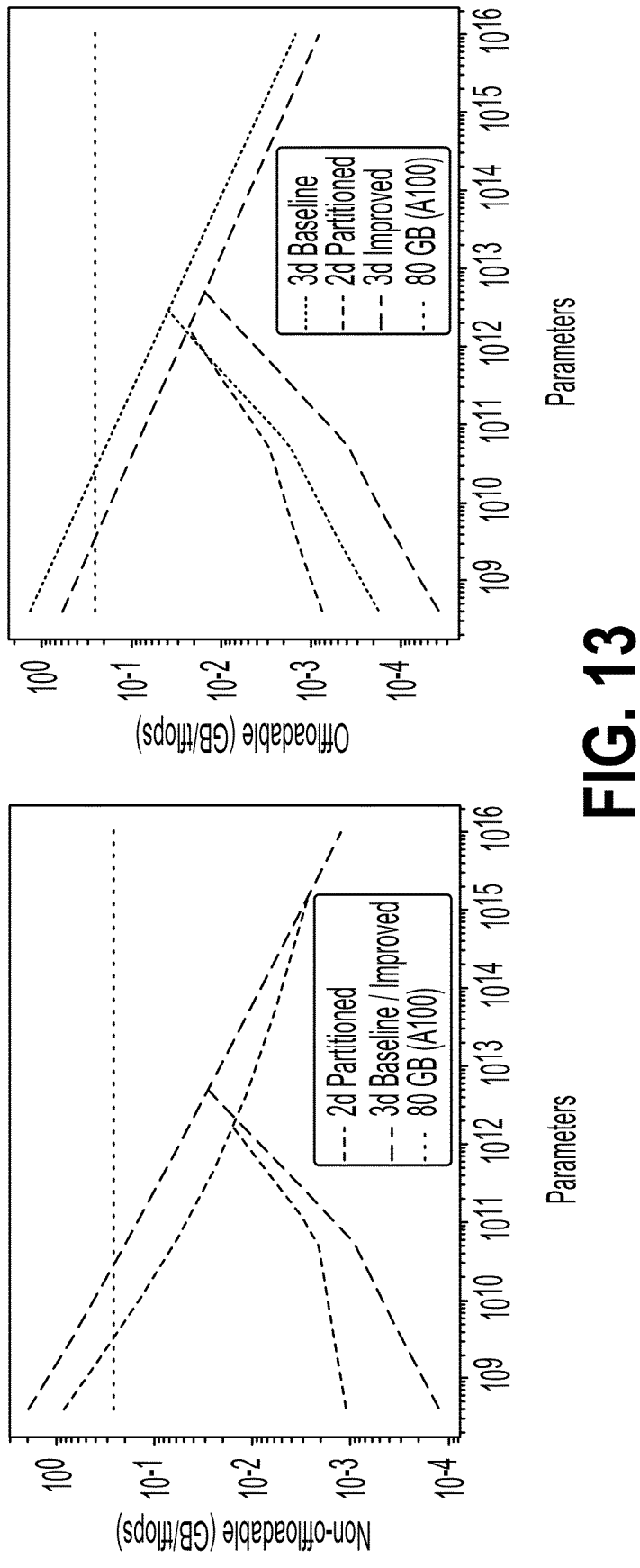
FIG. 13 depicts analytical results, in accordance with example embodiments.

FIG. 13 shows the memory-to-compute ratio for training a transformer in one month, as a function of the model size. The dotted line shows a faster training scheme which is already possible on A100s.

C. Ethernet is Enough

Figure 14:
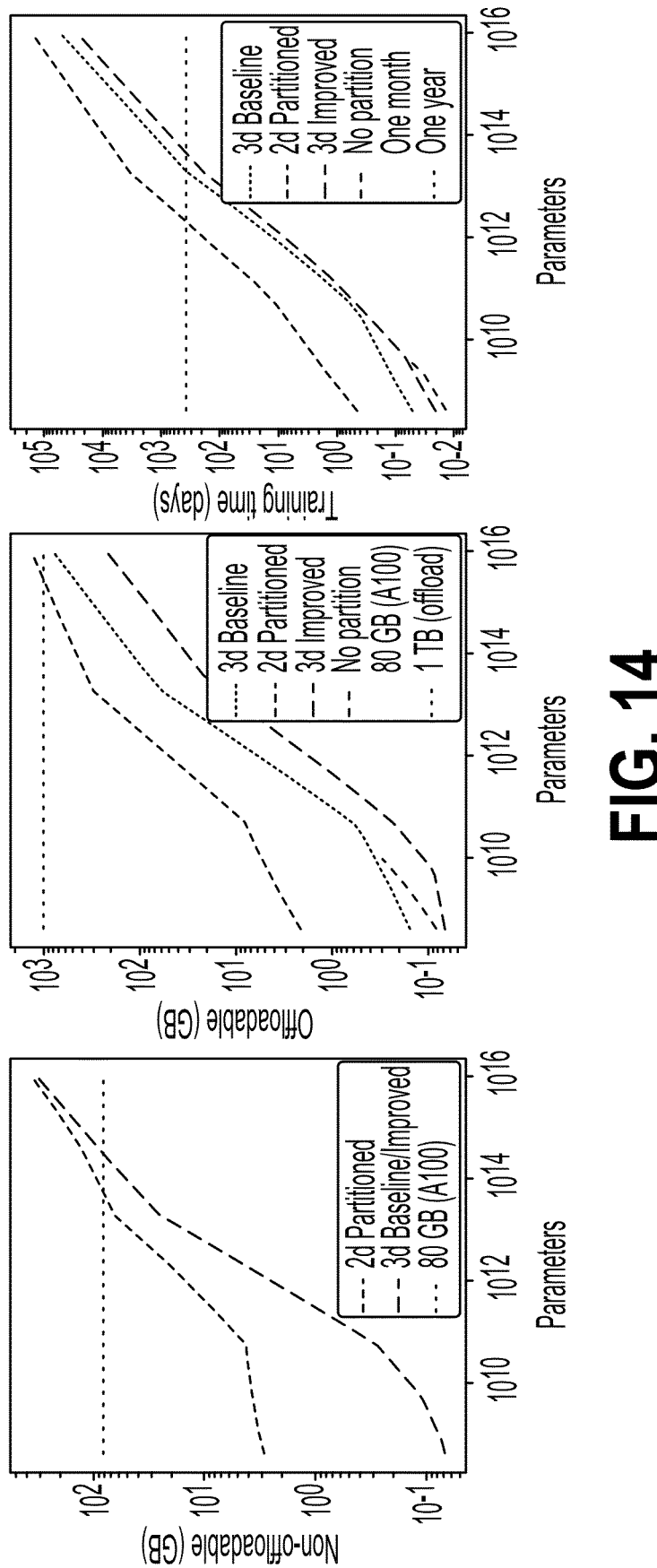
FIG. 14 depicts analytical results, in accordance with example embodiments.

While it is preferable to use a fast InfiniBand connection, such high-bandwidth interconnects may not be available in a data center. For this reason, we considered training over narrower-bandwidth links, like Ethernet. We assumed the nodes are equipped with a 400 Gb/s Ethernet connection, which amounts to 25 Gb/s per GPU. The analysis is shown in FIG. 14. For larger models, the slower connection makes less of a difference, provided pipeline parallelism is used. However, for smaller models, a higher degree of pipeline parallelism is beneficial to reduce the network usage, which makes it harder to mitigate the bubble effect in the improved case. For the trillion parameter model this slows down training by about 4%, but the effect is more pronounced at smaller scales. At those scales (below 50 billion parameters), the improvement in communication overlap from modular pipeline parallelism is manifest. Indeed, the improved method outperforms the baseline despite minimal bubble mitigation and the communication overhead from the sharding. For the smallest models, sharding can be avoided to further reduce the training time at a minimal memory cost (dotted line in FIG. 14). In short, an InfiniBand-level connection is not necessary to train large language models.

D. Beneficial Applications

The methods described herein, as part of a 3D parallelism techniques for machine learning model training, enables the training large language models or other massive machine learning models. A combination of layered gradient accumulation, modular pipeline parallelism, and/or training state sharding makes it possible to train such models within an acceptable time period while using a small fraction of the memory available on commercially available GPUs. Given a sufficiently large cluster, the methods described herein facilitate efficiently training models above the trillion parameter scale in a reasonable time.

These methods are also not overly demanding on the (inter-node) network, being able to perform relatively well with only an Ethernet-level connection. The methods described herein also facilitate the training of smaller models, which benefit from the improved communication overlap. These methods should facilitate the training of models such as BERT noticeably faster than with existing state-of-the-art methods, in a matter of minutes.

The recent interest in extremely large models has been in large part fueled by their potential to learn new tasks on the fly, eliminating the need for fine tuning. When fine tuning is still needed, the computational requirement are reduced when compared with training from scratch; however, the computational challenges remain to some extent. For example, fine tuning a trillion parameter model for 1000 steps requires over 2000 GPU-days, which remains too high for many research groups. Fine tuning can be done on smaller clusters than those considered in this paper, which may bring back the need to offload the training state. In that regard, the methods described herein improve over existing methods such as the ZeRO family. The reduced need for data transfers allows for an easier offload, while also reducing the activation memory and the network requirement. Note that fine-tuning models above the trillion parameter scale brings back the need for 3D parallelism and large clusters.

VIII. CLOSING

The present disclosure is not to be limited in terms of the particular embodiments described in this application, which are intended as illustrations of various aspects. Many modifications and variations can be made without departing from its scope, as will be apparent to those skilled in the art. Functionally equivalent methods and apparatuses within the scope of the disclosure, in addition to those described herein, will be apparent to those skilled in the art from the foregoing descriptions. Such modifications and variations are intended to fall within the scope of the appended claims.

The above detailed description describes various features and operations of the disclosed systems, devices, and methods with reference to the accompanying figures. The example embodiments described herein and in the figures are not meant to be limiting. Other embodiments can be utilized, and other changes can be made, without departing from the scope of the subject matter presented herein. It will be readily understood that the aspects of the present disclosure, as generally described herein, and illustrated in the figures, can be arranged, substituted, combined, separated, and designed in a wide variety of different configurations.

With respect to any or all of the message flow diagrams, scenarios, and flow charts in the figures and as discussed herein, each step, block, and/or communication can represent a processing of information and/or a transmission of information in accordance with example embodiments. Alternative embodiments are included within the scope of these example embodiments. In these alternative embodiments, for example, operations described as steps, blocks, transmissions, communications, requests, responses, and/or messages can be executed out of order from that shown or discussed, including substantially concurrently or in reverse order, depending on the functionality involved. Further, more or fewer blocks and/or operations can be used with any of the message flow diagrams, scenarios, and flow charts discussed herein, and these message flow diagrams, scenarios, and flow charts can be combined with one another, in part or in whole.

A step or block that represents a processing of information can correspond to circuitry that can be configured to perform the specific logical functions of a herein-described method or technique. Alternatively or additionally, a step or block that represents a processing of information can correspond to a module, a segment, or a portion of program code (including related data). The program code can include one or more instructions executable by a processor for implementing specific logical operations or actions in the method or technique. The program code and/or related data can be stored on any type of computer readable medium such as a storage device including RAM, a disk drive, a solid-state drive, or another storage medium.

The computer readable medium can also include non-transitory computer readable media such as non-transitory computer readable media that store data for short periods of time like register memory and processor cache. The non-transitory computer readable media can further include non-transitory computer readable media that store program code and/or data for longer periods of time. Thus, the non-transitory computer readable media may include secondary or persistent long-term storage, like ROM, optical or magnetic disks, solid-state drives, or compact disc read only memory (CD-ROM), for example. The non-transitory computer readable media can also be any other volatile or non-volatile storage systems. A non-transitory computer readable medium can be considered a computer readable storage medium, for example, or a tangible storage device.

Moreover, a step or block that represents one or more information transmissions can correspond to information transmissions between software and/or hardware modules in the same physical device. However, other information transmissions can be between software modules and/or hardware modules in different physical devices.

The particular arrangements shown in the figures should not be viewed as limiting. It should be understood that other embodiments could include more or less of each element shown in a given figure. Further, some of the illustrated elements can be combined or omitted. Yet further, an example embodiment can include elements that are not illustrated in the figures.

While various aspects and embodiments have been disclosed herein, other aspects and embodiments will be apparent to those skilled in the art. The various aspects and embodiments disclosed herein are for purpose of illustration and are not intended to be limiting, with the true scope being indicated by the following claims.

What is claimed is:

1. A computer-implemented method comprising:

operating M compute nodes to train a machine learning model based on a batch of N training examples, wherein the batch of N training examples is divided into n micro-batches, wherein the machine learning model comprises L layers, each layer defined by a respective plurality of parameters of the machine learning model, wherein operating the M compute nodes to train the machine learning model based on the batch of N training examples comprises updating the parameters of the machine learning model by:

sequentially applying, by a first compute node of the M compute nodes, each of the micro-batches to a first layer of the L layers to generate respective first-layer activation states;

transmitting, from the first compute node to a second compute node of the M compute nodes, the first-layer activation states;

sequentially applying, by the second compute node, each of the first-layer activation states to a second layer of the L layers to generate respective second-layer activation states for each of the micro-batches, wherein the second compute node applying a particular one of the first layer activation states to the second layer at least partially overlaps in time with the first compute node transmitting a subsequent one of the first layer activation states to the second compute node;

transmitting, from an $M^{th}$ compute node of the M compute nodes to the first compute node, $M^{th}$-layer activation states for each of the micro-batches;

sequentially applying, by the first compute node subsequent to generating the first-layer activation states, each of the $M^{th}$-layer activation states to an $(M+1)^{th}$ layer of the L layers to generate respective $(M+1)^{th}$-layer activation states for each of the micro-batches;

transmitting, from an $(M-1)^{th}$ compute node of the M compute nodes to the $M^{th}$ compute node, $(L-1)^{th}$-layer activation states for each of the micro-batches;

sequentially applying, by the $M^{th}$ compute node, each of the $(L-1)^{th}$-layer activation states to an $L^{th}$ layer of the L layers to generate respective $L^{th}$-layer activation states for each of the micro-batches;

based on the $L^{th}$-layer activation states, generating respective $L^{th}$-layer error states for each of the micro-batches;

sequentially applying, by the $M^{th}$ compute node, each of the $L^{th}$-layer error states to the $L^{th}$ layer to generate respective $(L-1)^{th}$-layer error states for each of the micro-batches and respective $L^{th}$-layer parameter update information for each of the micro-batches;

transmitting, from the $M^{th}$ compute node to the $(M-1)^{th}$ compute node, the $(L-1)^{th}$-layer error states;

sequentially applying, by the $(M-1)^{th}$ compute node, each of the $(L-1)^{th}$-layer error states to the $(L-1)^{th}$-layer to generate respective $(L-2)^{th}$-layer error states for each of the micro-batches and respective $(L-1)^{th}$-layer parameter update information for each of the micro-batches, wherein the $(M-1)^{th}$ compute node applying a particular one of the $(L-1)^{th}$-layer error states to the $(L-1)^{th}$-layer at least partially overlaps in time with the $M^{th}$ compute node transmitting a subsequent one of the $(L-1)^{th}$-layer error states to the $(M-1)^{th}$ compute node;

transmitting, from the first compute node to the $M^{th}$ compute node, $(L-M)^{th}$-layer error states for each of the micro-batches; and sequentially applying, by the $M^{th}$ compute node subsequent to generating the $(L-1)^{th}$-layer error states, each of the $(L-M)^{th}$-layer error states to an $(L-M)^{th}$ layer of the L layers to generate respective $(L-M-1)^{th}$-layer activation states for each of the micro-batches and respective $(L-M)^{th}$-layer parameter update information for each of the micro-batches.

2. The computer-implemented method of claim 1, wherein the machine learning model comprises a transformer.

3. The computer-implemented method of claim 2, wherein each layer of the L layers includes a discrete number of layers of the transformer.

4. The computer-implemented method of claim 1, further comprising:

transmitting, to the first compute node, a portion of the plurality of parameters of the machine learning model that define the $(M+1)^{th}$-layer prior to the first compute node applying each of the $M^{th}$-layer activation states to the $(M+1)^{th}$ layer to generate respective $(M+1)^{th}$-layer activation states for each of the micro-batches, wherein the first compute node applying at least one of the micro-batches to the first layer of the L layers to generate at least one respective first-layer activation states at least partially overlaps in time with transmitting the portion of the plurality of parameters of the machine learning model that define the $(M+1)^{th}$-layer to the first compute node.

5. The computer-implemented method of claim 1, wherein the number of micro-batches n equals the number of compute nodes M.

6. The computer-implemented method of claim 1, wherein each micro-batch includes a single training example from the batch of N training examples.

7. The computer-implemented method of claim 1, further comprising:

based on the $L^{th}$-layer parameter update information for each of the micro-batches, determining parameter updates for the plurality of parameters of the machine learning model that define the $L^{th}$-layer.

8. The computer-implemented method of claim 7, wherein determining parameter updates for the plurality of parameters of the machine learning model that define the $L^{th}$-layer commences prior to the $(M-1)^{th}$ compute node generating at least one of the $(L-2)^{th}$-layer error states.

9. The computer-implemented method of claim 7, wherein determining parameter updates for the plurality of parameters of the machine learning model that define the $L^{th}$-layer comprises:

transmitting, from the $M^{th}$ compute node to an additional compute node that is not one of the M compute nodes, the $L^{th}$-layer parameter update information for each of the micro-batches; and transmitting, from the additional compute node to the $M^{th}$ compute node, $L^{th}$-layer parameter update information for one or more additional micro-batches that are not part of the n micro-batches.

10. The computer-implemented method of claim 7, further comprising:

updating the plurality of parameters of the machine learning model that define the $L^{th}$-layer based on the parameter updates.

11. An article of manufacture including a non-transitory computer-readable medium, having stored thereon program instructions that, upon execution by a computing device, cause the computing device to perform operations comprising:

operating M compute nodes to train a machine learning model based on a batch of N training examples, wherein the batch of N training examples is divided into n micro-batches, wherein the machine learning model comprises L layers, each layer defined by a respective plurality of parameters of the machine learning model, wherein operating the M compute nodes to train the machine learning model based on the batch of N training examples comprises updating the parameters of the machine learning model by:

sequentially applying, by a first compute node of the M compute nodes, each of the micro-batches to a first layer of the L layers to generate respective first-layer activation states;

transmitting, from the first compute node to a second compute node of the M compute nodes, the first-layer activation states;

sequentially applying, by the second compute node, each of the first-layer activation states to a second layer of the L layers to generate respective second-layer activation states for each of the micro-batches, wherein the second compute node applying a particular one of the first layer activation states to the second layer at least partially overlaps in time with the first compute node transmitting a subsequent one of the first layer activation states to the second compute node;

transmitting, from an $M^{th}$ compute node of the M compute nodes to the first compute node, $M^{th}$-layer activation states for each of the micro-batches;

sequentially applying, by the first compute node subsequent to generating the first-layer activation states, each of the $M^{th}$-layer activation states to an $(M+1)^{th}$ layer of the L layers to generate respective $(M+1)^{th}$-layer activation states for each of the micro-batches;

transmitting, from an $(M-1)^{th}$ compute node of the M compute nodes to the $M^{th}$ compute node, $(L-1)^{th}$-layer activation states for each of the micro-batches;

sequentially applying, by the $M^{th}$ compute node, each of the $(L-1)^{th}$-layer activation states to an $L^{th}$ layer of the L layers to generate respective $L^{th}$-layer activation states for each of the micro-batches;

based on the $L^{th}$-layer activation states, generating respective $L^{th}$-layer error states for each of the micro-batches;

sequentially applying, by the $M^{th}$ compute node, each of the $L^{th}$-layer error states to the $L^{th}$ layer to generate respective $(L-1)^{th}$-layer error states for each of the micro-batches and respective $L^{th}$-layer parameter update information for each of the micro-batches;

transmitting, from the $M^{th}$ compute node to the $(M-1)^{th}$ compute node, the $(L-1)^{th}$-layer error states;

sequentially applying, by the $(M-1)^{th}$ compute node, each of the $(L-1)^{th}$-layer error states to the $(L-1)^{th}$-layer to generate respective $(L-2)^{th}$-layer error states for each of the micro-batches and respective $(L-1)^{th}$-layer parameter update information for each of the micro-batches, wherein the $(M-1)^{th}$ compute node applying a particular one of the $(L-1)^{th}$-layer error states to the $(L-1)^{th}$ layer at least partially overlaps in time with the $M^{th}$ compute node transmitting a subsequent one of the $(L-1)^{th}$-layer error states to the $(M-1)^{th}$ compute node;

transmitting, from the first compute node to the $M^{th}$ compute node, $(L-M)^{th}$-layer error states for each of the micro-batches; and sequentially applying, by the $M^{th}$ compute node subsequent to generating the $(L-1)^{th}$-layer error states, each of the $(L-M)^{th}$-layer error states to an $(L-M)^{th}$ layer of the L layers to generate respective $(L-M-1)^{th}$-layer activation states for each of the micro-batches and respective $(L-M)^{th}$-layer parameter update information for each of the micro-batches.

12. The article of manufacture of claim 11, wherein the operations further comprise:

transmitting, to the first compute node, a portion of the plurality of parameters of the machine learning model that define the $(M+1)^{th}$-layer prior to the first compute node applying each of the $M^{th}$-layer activation states to the $(M+1)^{th}$ layer to generate respective $(M+1)^{th}$-layer activation states for each of the micro-batches, wherein the first compute node applying at least one of the micro-batches to the first layer of the L layers to generate at least one respective first-layer activation states at least partially overlaps in time with transmitting the portion of the plurality of parameters of the machine learning model that define the $(M+1)^{th}$-layer to the first compute node.

13. The article of manufacture of claim 11, wherein the operations further comprise:

based on the $L^{th}$-layer parameter update information for each of the micro-batches, determining parameter updates for the plurality of parameters of the machine learning model that define the $L^{th}$-layer.

14. The article of manufacture of claim 13, wherein determining parameter updates for the plurality of parameters of the machine learning model that define the $L^{th}$-layer comprises:

transmitting, from the $M^{th}$ compute node to an additional compute node that is not one of the M compute nodes, the $L^{th}$-layer parameter update information for each of the micro-batches; and transmitting, from the additional compute node to the $M^{th}$ compute node, $L^{th}$-layer parameter update information for one or more additional micro-batches that are not part of the n micro-batches.

15. A computer-implemented method comprising:

operating M compute nodes to train a machine learning model based on a batch of N training examples, wherein the batch of N training examples is divided into n micro-batches, wherein the machine learning model comprises L layers, each layer defined by a respective plurality of parameters of the machine learning model, wherein operating the M compute nodes to train the machine learning model based on the batch of N training examples comprises updating the parameters of the machine learning model by:

sequentially applying, by a first compute node of the M compute nodes, each of the micro-batches to a first layer of the L layers to generate respective first-layer activation states;

transmitting, from the first compute node to a second compute node of the M compute nodes, the first-layer activation states;

sequentially applying, by the second compute node, each of the first-layer activation states to a second layer of the L layers to generate respective second-layer activation states for each of the micro-batches, wherein the second compute node applying a particular one of the first layer activation states to the second layer at least partially overlaps in time with the first compute node transmitting a subsequent one of the first layer activation states to the second compute node;

transmitting, from an Mth compute node of the M compute nodes to the first compute node, Mth-layer activation states for each of the micro-batches;

sequentially applying, by the first compute node subsequent to generating the first-layer activation states, each of the Mth-layer activation states to an (M+1) layer of the L layers to generate respective (M+1)th-layer activation states for each of the micro-batches;

sequentially applying, by the Mth compute node, (L−1)th-layer activation states received from an (M−1)th compute node of the M compute nodes to an $L^{th}$ layer of the L layers to generate respective $L^{th}$-layer activation states for each of the micro-batches; and based on the $L^{th}$-layer activation states, generating parameter update information for each of the micro-batches and for each of the L layers of the machine learning model.

16. The computer-implemented method of claim 15, further comprising:

transmitting, to the first compute node, a portion of the plurality of parameters of the machine learning model that define the (M+1)$^{th}$-layer prior to the first compute node applying each of the M$^{th}$-layer activation states to the (M+1)$^{th}$ layer to generate respective (M+1)$^{th}$-layer activation states for each of the micro-batches, wherein the first compute node applying at least one of the micro-batches to the first layer of the L layers to generate at least one respective first-layer activation states at least partially overlaps in time with transmitting the portion of the plurality of parameters of the machine learning model that define the (M+1)$^{th}$-layer to the first compute node.

17. The computer-implemented method of claim 15, wherein the number of micro-batches n equals the number of compute nodes M.

18. The computer-implemented method of claim 15, wherein each micro-batch includes a single training example from the batch of N training examples.

19. The computer-implemented method of claim 15, wherein generating parameter update information for each of the micro-batches and for each of the L layers of the machine learning model comprises:

commencing, by the M$^{th}$ compute node, determination of parameter updates for the plurality of parameters of the machine learning model that define the $L^{th}$-layer prior to the (M−1)$^{th}$ compute node completing the generation of (L−2)$^{th}$-layer error states by applying (L−1)$^{th}$-layer error states received from the M$^{th}$ compute node to the (L−1)$^{th}$-layer.

* * * * *